(12) United States Patent
Ishima et al.

(10) Patent No.: US 9,487,665 B2
(45) Date of Patent: Nov. 8, 2016

(54) PIGMENT DISPERSION LIQUID FOR INKJET INK, ACTIVE ENERGY RAY-CURABLE INKJET INK COMPOSITION, AND PRINTED PRODUCT

(71) Applicant: DNP FINE CHEMICALS CO., LTD., Kanagawa (JP)

(72) Inventors: Yukiko Ishima, Kanagawa (JP); Keishiro Yoshimori, Kanagawa (JP); Yukio Sugita, Kanagawa (JP)

(73) Assignee: DNP FINE CHEMICALS CO., LTD., Kanagawa (JP)

( * ) Notice: Subject to any disclaimer, the term of this patent is extended or adjusted under 35 U.S.C. 154(b) by 0 days.

(21) Appl. No.: 14/376,720

(22) PCT Filed: Feb. 5, 2013

(86) PCT No.: PCT/JP2013/052631
§ 371 (c)(1),
(2) Date: Sep. 11, 2014

(87) PCT Pub. No.: WO2013/118735
PCT Pub. Date: Aug. 15, 2013

(65) Prior Publication Data
US 2015/0030825 A1  Jan. 29, 2015

(30) Foreign Application Priority Data

Feb. 6, 2012 (JP) ................................ 2012-023438
Feb. 6, 2012 (JP) ................................ 2012-023439

(51) Int. Cl.
| | |
|---|---|
| *C09D 11/107* | (2014.01) |
| *C09D 11/101* | (2014.01) |
| *C09D 11/326* | (2014.01) |
| *C08K 3/04* | (2006.01) |
| *C08K 5/23* | (2006.01) |
| *C08K 5/3417* | (2006.01) |
| *C08K 5/3437* | (2006.01) |

(52) U.S. Cl.
CPC ............. *C09D 11/107* (2013.01); *C08K 3/04* (2013.01); *C08K 5/235* (2013.01); *C08K 5/3417* (2013.01); *C08K 5/3437* (2013.01); *C09D 11/101* (2013.01); *C09D 11/326* (2013.01); *Y10T 428/24901* (2015.01)

(58) Field of Classification Search
CPC . C09D 11/107; C09D 11/101; C09D 11/326; C08K 3/04; C08K 5/235; C08K 5/3417
See application file for complete search history.

(56) References Cited

U.S. PATENT DOCUMENTS

| | | | |
|---|---|---|---|
| 6,210,536 B1 | 4/2001 | Grossi et al. | |
| 2003/0199612 A1 | 10/2003 | Nakajima | |
| 2004/0180286 A1* | 9/2004 | Nagoya | C08L 79/08 430/270.1 |
| 2004/0259017 A1 | 12/2004 | Shibai et al. | |
| 2007/0167538 A1* | 7/2007 | Mochizuki et al. | 523/160 |
| 2008/0124483 A1 | 5/2008 | Takabayashi | |
| 2010/0075052 A1 | 3/2010 | Irita | |
| 2010/0215921 A1 | 8/2010 | Kagose | |

FOREIGN PATENT DOCUMENTS

| | | |
|---|---|---|
| CN | 1573584 A | 2/2005 |
| CN | 1803945 A | 7/2006 |
| CN | 101265368 A | 9/2009 |
| EP | 2 166 046 A1 | 3/2010 |
| EP | 2 363 436 A1 | 9/2011 |
| JP | 05-194614 A | 8/1993 |
| JP | 11-021484 A | 1/1999 |
| JP | 2001-311021 A | 11/2001 |
| JP | 2003-306622 A | 10/2003 |
| JP | 2007-231268 A | 9/2007 |
| JP | 2009-013228 A | 1/2009 |
| JP | 2010-195974 A | 9/2010 |
| JP | 2010-265405 A | 11/2010 |
| JP | 2011-057744 A | 3/2011 |
| JP | 2011-111522 A | 6/2011 |
| JP | 4-748063 B2 | 8/2011 |
| JP | 2011-195694 A | 10/2011 |
| JP | 2011-201932 A | 10/2011 |
| JP | 2013-147023 A | 8/2013 |
| TW | 201130868 A | 9/2011 |

OTHER PUBLICATIONS

BYK Additives &Instruments, Feb. 2009.*
Technical Data Sheet of BYKJET-9150, [online] 2011, retrieval date Mar. 22, 2013; Internet <URL:http://www.byk.com/en/additives/additives-by-name/bykjet-9150.php>.
International Search Report mailed Apr. 2, 2013: PCT/JP2013/052631.

* cited by examiner

*Primary Examiner* — Betelhem Shewareged
(74) *Attorney, Agent, or Firm* — Ladas & Parry LLP

(57) ABSTRACT

An object of the present invention is to provide: a pigment dispersion liquid for inkjet ink, which is stable for a long period of storage and which increases repellency to ink ejection surface. Disclosed is a pigment dispersion liquid for inkjet ink, comprising: a pigment; a pigment dispersing agent; and a compound having an ethylenically unsaturated double bond, wherein the pigment dispersing agent has an amine value of 20 mgKOH/g or less and an acid value of 10 mgKOH/g or less, contains one or more components selected from the group consisting of: a copolymer having a styrene-derived repeating unit, a repeating unit derived from an unsaturated fatty acid having 12 or more carbon atoms, and a repeating unit derived from a polyalkylene oxide having an ethylenically unsaturated double bond; a specific salt of the copolymer and an amine derivative of the copolymer.

6 Claims, No Drawings

PIGMENT DISPERSION LIQUID FOR INKJET INK, ACTIVE ENERGY RAY-CURABLE INKJET INK COMPOSITION, AND PRINTED PRODUCT

TECHNICAL FIELD

The present invention relates to a pigment dispersion liquid for inkjet ink, an active energy ray-curable inkjet ink composition, and a printed product containing a layer formed by curing the inkjet ink.

BACKGROUND ART

In recent years, active research has been conducted on an inkjet printing method using active energy ray. This is such a method that a liquid ink is applied to a paper, plastic or the like and then cured or cross-linked by, for example, UV irradiation. In contrast to a conventional inkjet ink printing method in which the ink is dried by heating, this method has advantages such that it is a fast-drying method; it uses no solvent; and it allows printing on media that absorb no ink. Inkjet methods need no plate upon printing, can eject and apply ink only to desired image areas, and can directly form an image on a recording medium. Therefore, attention has been focused on the inkjet printing method that uses active energy ray and allows efficient use of ink.

An active energy ray-curable ink composition generally uses no solvent. Therefore, in many cases, a polymerizable compound contained in the ink composition is used as a dispersion medium to disperse a pigment, so that the ink composition is often higher in viscosity than conventional ink compositions containing a solvent, and it faces difficulty in keeping ink stability over time.

In Patent Literature 1, a pigment dispersion containing a basic pigment dispersing agent having a comb-shaped skeleton, is disclosed as a technique for increasing the viscosity stability over time of a pigment dispersion containing C.I. Pigment Yellow 150.

In Patent Literature 2, an active light-curable inkjet ink containing a dispersing agent is disclosed, the dispersing agent having both an acid value and an amine value, and the acid value being larger than the amine value. In Patent Literature 2, it is mentioned that the technique of Patent Literature 2 makes it possible to record a high-resolution images stably, with high reproducibility.

However, the inkjet ink inventions of Patent Literatures 1 and 2 are problematic in that they show poor viscosity stability when heated. In addition, they are problematic in that they are likely to adhere to or remain on an ink ejection surface, such as the nozzle plate of an inkjet head, and to cause curved flight or nozzle clogging, therefore.

In the active energy ray-curable ink composition, a polymerizable compound is generally contained. Due to radicals or the like generated in the composition, a polymerization reaction may proceed in the composition during storage, which may be a cause of an increase in viscosity or a cause of gelation, therefore.

An ink composition has been proposed to solve the problem, which is produced by adding a polymerization inhibitor to inhibit polymerization reaction. For example, in Patent Literature 3, an active energy ray-curable ink composition is disclosed as a technique for improving viscosity stability, the composition containing phenothiazines and hindered phenols as a polymerization inhibitor.

Disclosed in Patent Literature 4 is an ink composition for forming a clear layer, containing at least one component selected from the group consisting of a hindered amine compound, a nitrosamine compound and a quinone compound as a polymerization inhibitor, for the purpose of obtaining an ink composition for forming a clear layer, the composition being able to maintain excellent viscosity stability for a long period of storage and to produce a clear layer with no haze and yellowing.

However, the techniques of Patent Literatures 3 and 4 are problematic in that they cannot provide an ink which is excellent in long-term viscosity stability both under an oxygen-free atmosphere (e.g., an aluminum bag) and in the presence of oxygen (e.g., a bottle) and which is excellent in curability. Also, they have such a problem that there is an increase in viscosity at a flow path or inkjet head in use, resulting in poor ejection stability, failure in homogeneous printing, and poor reproducibility.

CITATION LIST

Patent Literature 1: Japanese Patent Application Laid-Open (JP-A) No. 2011-195694
Patent Literature 2: JP Patent No. 4748063
Patent Literature 3: JP-A No. 2011-201932
Patent Literature 4: JP-A No. 2011-57744

SUMMARY OF INVENTION

Technical Problem

The present invention was achieved in light of the above-mentioned circumstances. An object of the present invention is to provide: a pigment dispersion liquid for inkjet ink, which is stable for a long period of storage at not only normal temperature but also high temperature and which increases repellency to ink ejection surface; an active energy ray-curable inkjet ink composition which is stable for a long period of storage at not only normal temperature but also high temperature, which is excellent in repellency to ink ejection surface, and which is less likely to cause clogging at the inkjet device; and a printed product containing a homogeneous ink layer with high reproducibility, by using the active energy ray-curable inkjet ink composition.

Solution to Problem

The pigment dispersion liquid according to the present invention contains: a pigment; a pigment dispersing agent; and a compound having an ethylenically unsaturated double bond, wherein the pigment dispersing agent has an amine value of 20 mgKOH/g or less and an acid value of 10 mgKOH/g or less, and the pigment dispersing agent contains one or more components selected from the group consisting of: a copolymer having a styrene-derived repeating unit, a repeating unit derived from an unsaturated fatty acid having 12 or more carbon atoms, and a repeating unit derived from a polyalkylene oxide having an ethylenically unsaturated double bond; an alkali metal salt of the copolymer; an alkaline-earth metal salt of the copolymer; an ammonium salt of the copolymer; and an amine derivative of the copolymer.

From the viewpoint of improving repellency, it is preferable that the pigment dispersion liquid for inkjet ink according to the present invention further contains a compound having a polyalkylene oxide chain and/or an aliphatic hydrocarbon chain having 12 or more carbon atoms, wherein the compound can contain an amide group or can have an amino group at a terminal thereof, and the amino group can be a salt-forming amino group.

In the pigment dispersion liquid for inkjet ink according to the present invention, from the viewpoint of maintaining stable viscosity for a long period of storage at normal temperature and high temperature, it is preferable that an unsaturated double bond equivalent per gram of the compound having an ethylenically unsaturated double bond, is 100 to 300 g/eq, and an acid value of the compound having an ethylenically unsaturated double bond, is 0.1% by mass or less in terms of acrylic acid. As the unsaturated double bond equivalent gets smaller, the inkjet member corrosivity of the inkjet ink containing the pigment dispersion liquid increases. As the unsaturated double bond equivalent gets larger, the viscosity of the ink increases. Therefore, the ejection stability of the ink may be deteriorated. As the acid value gets higher, the ink may cause gelation or an increase in viscosity, during a long period of storage or upon heating.

The active energy ray-curable inkjet ink composition according to the present invention contains the pigment dispersion liquid for inkjet ink according to the present invention and a photopolymerization initiator.

From the viewpoint of long-term stability both under an oxygen-free atmosphere and in the presence of oxygen, and also from the viewpoint of excellent curability, it is preferable that the active energy ray-curable inkjet ink composition according to the present invention further contains a polymerization inhibitor, and the polymerization inhibitor contains a phenothiazine-type polymerization inhibitor and a nitrosamine-type polymerization inhibitor.

From the viewpoint of long-term stability both under an oxygen-free atmosphere and in the presence of oxygen, and also from the viewpoint of excellent curability, in the active energy ray-curable inkjet ink composition according to the present invention, it is preferable that a content of the phenothiazine-type polymerization inhibitor in the inkjet ink composition is 0.001 to 0.2% by mass, and a content of the nitrosamine-type polymerization inhibitor in the inkjet ink composition is 0.001 to 0.2% by mass.

The present invention provides a printed product containing a layer formed by curing the active energy ray-curable inkjet ink composition according to the present invention on a recording medium.

Advantageous Effects of Invention

According to the present invention, the following can be provided: a pigment dispersion liquid for inkjet ink, which is stable for a long period of storage at not only normal temperature but also high temperature and which increases repellency to ink ejection surface; an active energy ray-curable inkjet ink composition which is stable for a long period of storage at not only normal temperature but also high temperature, which is excellent in repellency to ink ejection surface, and which is less likely to cause clogging at the inkjet device; and a printed product containing a homogeneous ink layer with high reproducibility, by using the active energy ray-curable inkjet ink composition.

DESCRIPTION OF EMBODIMENTS

Hereinafter, the present invention will be explained in detail.

In the present invention, "(meth)acryloyl" means acryloyl and/or methacryloyl; "(meth)acrylic" means acrylic and/or methacrylic; and "(meth)acrylate" means acrylate and/or methacrylate.

Also in the present invention, "active energy ray" encompasses not only electromagnetic waves with wavelengths in the visible and non-visible ranges, but also particle beams (such as electron beams) and radiation and ionizing radiation, which are general terms for electromagnetic waves and particle beams.

<Pigment Dispersion Liquid for Inkjet Ink>

The pigment dispersion liquid for inkjet ink according to the present invention contains: a pigment; a pigment dispersing agent; and a compound having an ethylenically unsaturated double bond, wherein the pigment dispersing agent has an amine value of 20 mgKOH/g or less and an acid value of 10 mgKOH/g or less, and the pigment dispersing agent contains one or more components selected from the group consisting of: a copolymer having a styrene-derived repeating unit, a repeating unit derived from an unsaturated fatty acid having 12 or more carbon atoms, and a repeating unit derived from a polyalkylene oxide having an ethylenically unsaturated double bond; an alkali metal salt of the copolymer; an alkaline-earth metal salt of the copolymer; an ammonium salt of the copolymer; and an amine derivative of the copolymer.

The pigment dispersion liquid for inkjet ink according to the present invention has excellent temporal stability, during storage at not only normal temperature but also high temperature, even though it contains substantially no solvent. Also, the active energy ray-curable inkjet ink composition containing the pigment dispersion liquid of the present invention, is excellent in repellency to ink ejection surface, causes no clogging at the inkjet device, and is excellent in ejection stability. Also, the ink layer formed by curing the inkjet ink composition is a homogeneous layer with high reproducibility and can produce a high-quality printed product, therefore.

The mechanism that the above-specified combination exerts the above-mentioned effects, is not clear yet. However, it is presumed as follows.

The active energy ray-curable inkjet ink composition generally uses no solvent. Therefore, the polymerizable monomer serves as a dispersion medium. The pigment dispersion liquid in which the polymerizable monomer serves as the dispersion medium, is problematic in that a polymerization reaction or the like of the polymerizable monomer gradually proceeds, so that there is an increase in viscosity during storage. Especially, due to a temperature increase caused by friction during dispersion or due to use in a heating condition, gelation or poor dispersion stability is caused and results in an increase in viscosity. In general, a pigment dispersing agent contains a relatively large amount of polar groups such as basic and acidic groups, so that dispersion stability is maintained by electrical repulsion. However, in a heating condition, the polar groups induce a polymerization reaction of a monomer; therefore, it is presumed that gelation is caused or dispersion stability is particularly deteriorated.

In the pigment dispersion liquid for inkjet ink according to the present invention, the compound having an ethylenically unsaturated double bond, which is a polymerizable monomer, is used as a dispersion medium, and one or more components selected from the group consisting of: a copolymer having a styrene-derived repeating unit, a repeating unit derived from an unsaturated fatty acid having 12 or more carbon atoms, and a repeating unit derived from a polyalkylene oxide having an ethylenically unsaturated double bond; an alkali metal salt of the copolymer; an alkaline-earth metal salt of the copolymer; an ammonium salt of the copolymer; and an amine derivative of the copolymer, are used in combination as the pigment dispersing agent. In the case of using the pigment dispersing agent, it is presumed that a styrene-derived aromatic ring, polar groups of the unsaturated fatty acid having 12 or more carbon atoms, etc., are adsorbed onto the pigment by acid-base interaction or π-π interaction. Meanwhile, the polyalkylene oxide chain has excellent affinity for the compound having an ethylenically unsaturated double bond, which serves as the dispersion medium. As just described, dispersion stability is maintained by the steric protection layer formed by the polyalkylene oxide chain and, at the same time, a styrene-derived aromatic ring and a fatty acid derived from the unsaturated fatty acid having 12 or more carbon atoms are adsorbed to cover the pigment. Also in the present invention, the pigment dispersing agent has an amine value of 20 mgKOH/g or less and an acid value of 10 mgKOH/g or less. Therefore, the pigment dispersing agent is a low polar pigment dispersing agent having a small amount of acidic and basic groups. Therefore, even in the case of heating or a long period of storage, it is presumed that an acceleration in polymerization reaction of the ethylenically unsaturated double bond, which is caused by the polar groups, can be inhibited or reduced. As a result, even in the case of heating or a long period of storage, viscosity change is presumed to be small.

Also, by using the above-described low-polar pigment dispersion agent, it is presumed that the amount of ink attached to the ink ejection surface of the inkjet head is small, so that excellent repellency to ink ejection surface is obtained.

The pigment dispersion liquid for inkjet ink according to the present invention contains at least the pigment, the pigment dispersing agent and the compound having an ethylenically unsaturated double bond. As needed, it can further contain other component(s).

Hereinafter, such components that can be contained in the pigment dispersion liquid for inkjet ink according to the present invention, will be described in detail.

(Pigment)

In the present invention, the pigment is not particularly limited. For example, there may be mentioned pigments that have been used in inkjet ink, such as achromatic inorganic pigments including titanium oxide, calcium carbonate and microsilica, and chromatic organic pigments. These pigments can be used alone or in combination of two or more. Concrete examples of organic pigments include insoluble azo pigments, soluble azo pigments, derivatives derived from dyes, phthalocyanine-based organic pigments, quinacridone-based organic pigments, perylene-based organic pigments, isoindolinone-based organic pigments, pyranthrone-based organic pigments, thioindigo-based organic pigments, condensed azo-based organic pigments, benzimidazolone-based organic pigments, quinophthalone-based organic pigments, isoindoline-based organic pigments, and other pigments such as carbon black, nickel azo yellow and dioxazine violet.

Organic pigment examples represented by Color Index (C.I.) numbers are as follows:

C.I. Pigment Yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213 and 214

C.I. Pigment Red 5, 7, 9, 12, 48, 49, 52, 53, 57, 97, 112, 122, 123, 149, 168, 177, 180, 184, 192, 202, 206, 209, 215, 216, 217, 220, 223, 224, 226, 227, 228, 238, 240 and 254

C.I. Pigment Orange 16, 36, 43, 51, 55, 59 and 61

C.I. Pigment Violet 19, 23, 29, 30, 37, 40 and 50

C.I. Pigment Blue 15, 15:1, 15:3, 15:4, 15:6, 16, 22, 60 and 64

C.I. Pigment Green 7, 36 and 58

C.I. Pigment Brown 23, 25 and 26

Examples of the inorganic pigments include titanium oxide, barium sulfate, calcium carbonate, zinc oxide, lead sulfate, yellow lead, zinc yellow, red iron oxide (red iron(III) oxide), cadmium red, ultramarine blue, prussian blue, chromium oxide green, cobalt green, amber, titanium black and synthetic iron black. In addition, there may be mentioned aluminum paste and synthetic mica.

The dispersed particle diameter of the pigment is not particularly limited, as long as desired colors can be produced. The dispersed particle diameter varies depending on the type of the pigment used. However, from the viewpoint of obtaining excellent pigment dispersibility and dispersion stability and sufficient tinting strength, the median diameter of the pigment is preferably in the range of 10 to 300 nm, more preferably 20 to 250 nm. When the median diameter is equal to or less than the upper limit, nozzle clogging is less likely to occur at the inkjet head, and a homogeneous image can be obtained with high reproducibility. Therefore, the printed product thus obtained is a high-quality printed product.

The dispersed particle diameter of the pigment is a dispersed particle diameter of pigment particles dispersed in a dispersion, and it is measured with a laser scattering particle size analyzer. An example of particle diameter measurement with a laser scattering particle size analyzer is as follows: a dispersion is diluted with a monomer to a concentration that is measurable with a laser scattering particle size analyzer (e.g., 1,000-fold), the monomer being a monomer which is used as the dispersion medium for dispersions, and then the particle diameter is measured with a laser scattering particle size analyzer (e.g., Fiber-optics particle analyzer FPAR-1000 manufactured by Otsuka Electronics Co., Ltd.) by dynamic light scattering at 23° C.

In the present invention, the content of the pigment can be appropriately adjusted. Depending on the type of the pigment, the content of the pigment in the pigment dispersion liquid for inkjet ink is preferably 5 to 60% by mass, more preferably 10 to 50% by mass, from the viewpoint of balancing dispersibility with tinting strength. In the case of an organic pigment, the content of the pigment in the pigment dispersion liquid for inkjet ink is preferably 5 to 30% by mass, more preferably 10 to 25% by mass, from the viewpoint of balancing dispersibility and tinting strength. In the case of an inorganic pigment, the content of the pigment in the pigment dispersion liquid for inkjet ink is preferably 10 to 60% by mass, more preferably 20 to 50% by mass, from the viewpoint of balancing dispersibility and tinting strength.

(Pigment Dispersing Agent)

In the present invention, the pigment dispersing agent has an amine value of 20 mgKOH/g or less and an acid value of 10 mgKOH/g or less. Also, the pigment dispersing agent contains one or more components selected from the group consisting of: a copolymer having a styrene-derived repeating unit, a repeating unit derived from an unsaturated fatty acid having 12 or more carbon atoms, and a repeating unit derived from a polyalkylene oxide having an ethylenically unsaturated double bond (hereinafter may be simply referred to as "copolymer"); an alkali metal salt of the copolymer; an alkaline-earth metal salt of the copolymer; an ammonium salt of the copolymer; and an amine derivative of the copolymer (hereinafter may be simply referred to as "copolymer, etc.") As needed, the pigment dispersing agent can contain other pigment dispersing agent(s), as long as the effects of the present invention are not impaired.

In the present invention, by using the above-specified pigment dispersing agent, excellent viscosity stability over time and excellent repellency can be provided to the pigment dispersion liquid in which the below-described compound having an ethylenically unsaturated double bond is used as the dispersion medium.

[Amine and Acid Values of the Pigment Dispersing Agent]

The pigment dispersing agent of the present invention has an amine value of 20 mgKOH/g or less and an acid value of 10 mgKOH/g or less. By using such a pigment dispersing agent, a pigment dispersion liquid with excellent storage stability and excellent repellency to ink ejection surface can be obtained. In the case of using two or more pigment dispersing agents in combination, the amine value and acid value of the whole pigment dispersing agent are needed to be within the above ranges.

The amine value of the pigment dispersing agent is particularly preferably 17 mgKOH/g or less, from the viewpoint of excellent storage stability and excellent repellency to ink ejection surface. The acid value of the pigment dispersing agent is particularly preferably 7 mgKOH/g or less, from the viewpoint of excellent storage stability and excellent repellency to ink ejection surface.

In the present invention, "amine value" means the mass of potassium hydroxide (mg) which is equivalent to the amount of hydrochloric acid that is required to neutralize 1 g solid content. It can be obtained by the method defined by JIS K7237.

Also in the present invention, "acid value" is the mass of KOH (mg) which is required to neutralize 1 g solid content. It can be measured by the method defined by JIS K0070.

Also in the present invention, "solid content" means components except solvents.

[Copolymer Having a Styrene-Derived Repeating Unit, a Repeating Unit Derived from an Unsaturated Fatty Acid Having 12 or More Carbon Atoms, and a Repeating Unit Derived from a Polyalkylene Oxide Having an Ethylenically Unsaturated Double Bond]

The copolymer specified above and used as the pigment dispersing agent in the present invention, is needed to have a styrene-derived repeating unit, a repeating unit derived from an unsaturated fatty acid having 12 or more carbon atoms, and a repeating unit derived from a polyalkylene oxide having an ethylenically unsaturated double bond. The copolymer can further have other repeating unit(s). The above-specified copolymer is one obtained by using at least the following monomers and polymerizing the ethylenically unsaturated double bond of each monomer: (1) styrene, (2) unsaturated fatty acid having 12 or more carbon atoms, and (3) polyalkylene oxide having an ethylenically unsaturated double bond. The repeating unit derived from each monomer means a structure in which the ethylenically unsaturated double bond of each monomer is open (i.e., a single bond (—C—C—) structure turned from the double bond (C═C)).

Hereinafter, the repeating units constituting the copolymer will be described in order. However, "(1) styrene" will not be described here since the unit structure is clear.

(2) Unsaturated Fatty Acid Having 12 or More Carbon Atoms

The unsaturated fatty acid having 12 or more carbon atoms is not particularly limited, as long as it has one or more ethylenically unsaturated double bonds. From the viewpoint of pigment dispersibility and dispersion stability, it is preferably an unsaturated fatty acid having 12 to 30 carbon atoms, more preferably an unsaturated fatty acid having 15 to 20 carbon atoms, still more preferably an unsaturated fatty acid having 16 to 18 carbon atoms.

The position of the ethylenically unsaturated double bond is not particularly limited in the carbon chain of the unsaturated fatty acid. From the viewpoint of pigment dispersibility and dispersion stability, it is preferable that the carbon atom at the terminal and the carbon atom in the α-position (second position) of the carboxy group have no ethylenically unsaturated double bond, and it is also preferable that carbon atoms at the center or near the center, that is, in the case of the unsaturated fatty acid having 16 to 18 carbon atoms, any adjacent carbon atoms in the fourth to twelfth positions have an ethylenically unsaturated double bond.

Concrete examples of the unsaturated fatty acid having 12 or more carbon atoms include palmitoleic acid, oleic acid, elaidic acid, vaccenic acid, linoleic acid, linolenic acid, eleostearic acid, arachidonic acid, erucic acid and nervonic acid. Of them, preferred are palmitoleic acid, oleic acid, elaidic acid and vaccenic acid.

These unsaturated fatty acids can be used alone or in combination of two or more.

The repeating unit derived from the unsaturated fatty acid having 12 or more carbon atoms, can be one in which the carboxy group at the terminal thereof is esterified and/or amidated.

The alcohol used for the esterification is not particularly limited. For example, there may be mentioned a straight- or branched-chain alcohol having 1 to 30 carbon atoms, which can further have a substituent such as an aromatic group or alicyclic group, or in which a heteroatom such as an oxygen atom can be contained in the carbon chain. Concrete examples of the alcohol used for the esterification include 2-butoxyethanol, diethylene glycol monobutyl ether, triethylene glycol monobutyl ether, propylene glycol monomethyl ether, 2-phenoxyethanol and 2-(2-phenoxyethoxyl)ethanol.

These alcohols can be used alone or in combination of two or more.

The compound used for the amidation is not particularly limited. For example, there may be mentioned ammonia, primary amine, secondary amine and amino alcohol having 1 to 20 carbon atoms. Concrete examples of the compound used for the amidation include cyclohexylamine, octadecenylamine, dibutylamine, benzylamine and diisotridecylamine.

These compounds can be used alone or in combination of two or more.

The esterification and/or amidation of the carboxy group can be carried out by known methods and is not particularly limited. The esterification and/or amidation of the carboxy group can be carried out before polymerizing the copolymer, or it can be carried out after polymerizing the copolymer.

(3) Polyalkylene Oxide Having an Ethylenically Unsaturated Double Bond

The polyalkylene oxide having an ethylenically unsaturated double bond is not particularly limited. From the viewpoint of pigment dispersibility and dispersion stability, it is preferably a polyalkyleneoxy allyl ether represented by the following general formula (1):

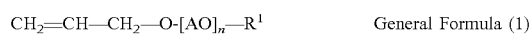

$$CH_2=CH-CH_2-O-[AO]_n-R^1 \qquad \text{General Formula (1)}$$

In the general formula (1), "AO" represents an alkyleneoxy unit having 2 to 10 carbon atoms; multiple "AO"s can be the same as or different from each other; $R^1$ is a hydrogen atom, an alkyl group having 1 to 6 carbon atoms, or a group represented by $-C(=O)-R^2$; $R^2$ is an alkyl group having 1 to 6 carbon atoms; "n" means the number of the repeating units "AO" and is an integer of 2 or more.

The alkyleneoxy unit as "AO" is preferably an ethyleneoxy unit and/or propyleneoxy unit, more preferably an ethyleneoxy unit.

The average repeating unit number of the polyalkylene oxide having an ethylenically unsaturated double bond, is not particularly limited. From the viewpoint of pigment dispersibility and dispersion stability, the average repeating unit number is preferably 10 to 60 mol, more preferably 20 to 50 mol, still more preferably 30 to 40 mol, relative to 1 mol of the repeating unit derived from the unsaturated fatty acid.

Concrete examples of the polyalkylene oxide having an ethylenically unsaturated double bond include polyoxyethylene allyl methyl ether, polyoxypropylene monoallyl methyl ether, polyoxypropylene monoallyl ether monoacetate, and polyoxyethylene polyoxypropylene allyl methyl ether.

They can be used alone or in combination of two or more.

The polyalkylene oxide having an ethylenically unsaturated double bond can be obtained by known methods and from, for example, allyl alcohol and alkylene oxide having an oxirane ring.

(4) Other Repeating Units

The copolymer used as the pigment dispersing agent can further have other repeating units. Examples of other repeating units include a repeating unit derived from a dicarboxylic acid compound having an ethylenically unsaturated bond. Concrete examples thereof include maleic acid, fumaric acid, itaconic acid, citraconic acid and acid anhydrides thereof such as maleic anhydride and citraconic anhydride.

The repeating unit derived from the dicarboxylic acid can be one in which the carboxy groups are esterified, amidated or imidized. The alcohol used for the esterification and the compound used for the amidation or imidization are not particularly limited. For example, there may be used the above-mentioned alcohols used for the esterification of the unsaturated fatty acid having 12 or more carbon atoms, and the above-mentioned compounds used for the amidation of the unsaturated fatty acid having 12 or more carbon atoms.

Other repeating units can be the following: (meth)acrylic acid esters such as methyl(meth)acrylate, ethyl(meth)acrylate, propyl(meth)acrylate, butyl(meth)acrylate, hexyl(meth)acrylate, 2-ethylhexyl(meth)acrylate, stearyl(meth)acrylate, lauryl(meth)acrylate, cyclohexyl(meth)acrylate, benzyl(meth)acrylate, trifluoromethyl(meth)acrylate, hexafluoropropyl(meth)acrylate, tetrafluoropropyl(meth)acrylate, propylene glycol mono(meth)acrylate and polyethylene glycol mono(meth)acrylate; α-methylstyrene, vinyltoluene and vinylcyclohexane; vinyl esters of aliphatic or aromatic carboxylic acids, such as vinyl acetate, vinyl propionate, vinyl butanoate, vinyl hexanoate, vinyl octanoate, vinyl decanoate, vinyl stearate, vinyl palmitate, vinyl propionate, divinyl adipate, divinyl sebacate, vinyl 2-ethylhexanoate and vinyl trifluoroacetate; aliphatic or aromatic allyl esters such as allyl acetate, allyl propionate, allyl butanoate, allyl hexanoate, allyl octanoate, allyl decanoate, allyl stearate, allyl palmitate, allyl salicylate, allyl lactate, diallyl oxalate, diallyl stearate, diallyl succinate, diallyl glutarate, diallyl adipate, diallyl pimelate, diallyl maleate, diallyl phthalate and diallyl isophthalate; and alkyl vinyl ethers such as vinyl ethyl ether and vinyl polyether.

(5) Method for Producing the Copolymer

The copolymer used as the pigment dispersing agent can be produced by polymerizing the styrene-derived repeating unit, the repeating unit derived from the unsaturated fatty acid having 12 or more carbon atoms, the repeating unit derived from the polyalkylene oxide having an ethylenically unsaturated double bond and, as needed, other repeating units, by a known polymerization method such as emulsion polymerization, suspension polymerization, precipitation polymerization, solution polymerization or bulk polymerization. Of them, preferred are free radical solution polymerization and bulk polymerization.

In the present invention, the copolymer can be used as it is, as the pigment dispersing agent. In the case where the carboxylic acid remains in the copolymer, the carboxylic acid can be turned into an alkali metal salt of the copolymer, an alkaline-earth metal salt of the copolymer, an ammonium salt of the copolymer, and an amine derivative of the copolymer for use, by neutralizing the carboxylic acid with alkali metal hydroxide, alkaline-earth metal hydroxide, ammonia or amino alcohol.

It is preferable that the copolymer has a comb-shaped structure in which a hydrocarbon chain derived from the unsaturated fatty acid and a polyalkylene oxide chain are side chains and which is obtained by copolymerizing the styrene-derived repeating unit, the repeating unit derived from the unsaturated fatty acid having 12 or more carbon atoms, and the repeating unit derived from the polyalkylene oxide having an ethylenically unsaturated double bond. In the copolymer, the repeating units can be randomly polymerized, or the copolymer can be a block copolymer in which each of blocks is formed by each repeating unit. From the point of view that pigment adsorption becomes locally strong and dispersion stability can be increased by thickening the steric protection layer, it is preferable that the styrene-derived repeating unit and the repeating unit derived from the unsaturated fatty acid having 12 or more carbon atoms are locally dense, that is, a block or blocks are formed by the repeating units. It is also preferable that a block is formed by the repeating unit derived from a polyalkylene oxide.

In the copolymer, etc., from the viewpoint of dispersibility and dispersion stability, the mol ratio of each constituent is such that the average number of the styrene-derived repeating unit is preferably 1 to 10 mol, more preferably 2 to 5 mol, relative to 1 mol of the repeating unit derived from an unsaturated fatty acid. From the viewpoint of increasing affinity for the dispersion medium and increasing pigment dispersibility and dispersion stability, the average repeating unit number derived from the polyalkylene oxide having an ethylenically unsaturated double bond, is preferably 10 to 60 mol, more preferably 20 to 50 mol, still more preferably 30 to 40 mol, relative to 1 mol of the repeating unit derived from the unsaturated fatty acid. By setting the number of each repeating unit within the above range, affinity for the dispersion medium is increased, and the polyalkylene oxide chain is expanded in the dispersion medium; therefore, pigment dispersibility and dispersion stability can be increased.

The molecular weight of the copolymer, etc., is not particularly limited. From the viewpoint of pigment dispersibility, dispersion stability, and viscosity of the pigment dispersion liquid, the weight average molecular weight is preferably 5,000 to 30,000, more preferably 8,000 to 20,000, and still more preferably 10,000 to 15,000. As used herein, "weight average molecular weight" is a standard polystyrene equivalent molecular weight obtained by gel permeation chromatography (GPC).

In the copolymer, etc., an acidic or basic group can be contained to the extent that does not impair the effects of the present invention. However, the content is preferably small. In the present invention, "acidic group" means a group which exhibits acidity by releasing H⁺ in water. For example, there may be mentioned a carboxy group, a sulfo group, etc. Also in the present invention, "basic group" means a group which exhibits basicity by accepting H⁺ in water. For example, there may be mentioned an amino group.

In the copolymer, etc., the content of the repeating unit containing an acidic or basic group is preferably 40% by mass or less, more preferably 30% by mass or less.

The amine and acid values of the copolymer, etc., are not particularly limited, as long as the pigment dispersing agent has an amine value of 20 mgKOH/g or less and an acid value of 10 mgKOH/g or less. From the viewpoint of excellent storage stability, the amine value of the copolymer, etc., is preferably 20 mgKOH/g or less, more preferably 17 mgKOH/g or less. Also from the viewpoint of excellent storage stability, the acid value of the copolymer, etc., is preferably 10 mgKOH/g or less, more preferably 7 mgKOH/g or less.

As the copolymer, etc., for example, there may be used "BYKJET-9150" manufactured by BYK Japan KK.

In the pigment dispersion liquid for inkjet ink according to the present invention, the content of the pigment dispersing agent is not particularly limited. The content of the pigment dispersing agent in the pigment dispersion liquid for inkjet ink is generally 20 to 60 parts by mass, relative to 100 parts by mass of the pigment. From the viewpoint of dispersibility and dispersion stability, it is preferably 25 to 55 parts by mass, more preferably 30 to 50 parts by mass. Also, the content of the pigment dispersing agent in the pigment dispersion liquid for inkjet ink is preferably 2 to 30% by mass, more preferably 4 to 25% by mass. When the content of the pigment dispersing agent is small, no steric protection layer may be formed and may result in aggregation of the pigment. When the content is too large, viscosity may be increased and may result in poor ejection performance. The content of the pigment dispersing agent is in terms of solid content.

In the pigment dispersion liquid for inkjet ink according to the present invention, no particular limitation is imposed on the content of the pigment dispersing agent which has an amine value of 20 mgKOH/g or less and an acid value of 10 mgKOH/g or less, and which contains one or more components selected from the group consisting of: the copolymer having the styrene-derived repeating unit, the repeating unit derived from the unsaturated fatty acid having 12 or more carbon atoms, and the repeating unit derived from the polyalkylene oxide having an ethylenically unsaturated double bond; an alkali metal salt of the copolymer; an alkaline-earth metal salt of the copolymer; an ammonium salt of the copolymer; and an amine derivative of the copolymer. The content of the copolymer, etc., in the pigment dispersion liquid for inkjet ink is generally 20 to 60 parts by mass relative to 100 parts by mass of the pigment. From the viewpoint of dispersibility and dispersion stability, it is preferably 25 to 55 parts by mass, more preferably 30 to 50 parts by mass. Also, the content of the copolymer, etc., in the pigment dispersion liquid for inkjet ink is preferably 2 to 30% by mass, more preferably 4 to 25% by mass. The content of the copolymer, etc., is in terms of solid content.

In the pigment dispersion liquid for inkjet ink according to the present invention, other pigment dispersing agents can be further contained as needed, to the extent that does not impair the effects of the present invention. Other pigment dispersing agents are not particularly limited. For example, there may be used a cationic, anionic, nonionic, amphoteric, silicon-based or fluorine-based surfactant. Examples of surfactants include the following polymeric surfactants (polymer dispersants).

For example, polymer dispersants include a dispersant which has a polyester main chain, polyacrylic main chain, polyurethane main chain, polyamine main chain or polycaprolactone main chain and a polar group such as an amino group, carboxy group, sulfo group or hydroxy group at the side chain.

Examples of such a polymer dispersant include the following: (co)polymers of unsaturated carboxylic esters such as polyacrylic ester; (partial) amine salts, (partial) ammonium salts and (partial) alkylamine salts of (co)polymers of unsaturated carboxylic acids such as polyacrylic acid; (co)polymers of hydroxyl group-containing unsaturated carboxylic esters such as hydroxyl group-containing polyacrylic ester, and modified products thereof; polyurethanes; unsaturated polyamides; polysiloxanes; long-chain polyaminoamide phosphates; polyethyleneimine derivatives (amides obtained by reaction of poly(lower alkyleneimine) and a free carboxy group-containing polyester, and bases thereof; and polyallylamine derivatives (reaction products obtained by reaction of polyallylamine and one or more components selected from the group consisting of the following three compounds: a free carboxy group-containing polyester; a free carboxy group-containing polyamide; and a free carboxy group-containing co-condensate of ester and amide (polyester amide)).

Such a polymer dispersant can be a commercially-available product. For example, there may be mentioned "SOLSPERSE" manufactured by Lubrizol Corporation, "DISPERBYK" manufactured by BYK Japan KK., and "EFKA" manufactured by EFKA Additives.

In the pigment dispersion liquid for inkjet ink according to the present invention, the content of the other pigment dispersing agent is not particularly limited, as long as the effects of the present invention are not impaired. In the pigment dispersing agent, the content of the other pigment dispersing agent is preferably 10% by mass or less. It is more preferable that the other pigment dispersing agent is not substantially contained.

(Compound Having an Ethylenically Unsaturated Double Bond)

The compound having an ethylenically unsaturated double bond used in the active energy ray-curable inkjet ink composition of the present invention, is not particularly limited, as long as it is a compound that is polymerizable by function of the below-described photopolymerization initiator.

The compound can have one or more ethylenically unsaturated double bonds. From the viewpoint of curability of the ink thus obtained and layer strength, preferred is a compound having two or more ethylenically unsaturated double bonds. From the viewpoint of small shrinkage upon curing and adhesion to recording media, preferred is a compound having only one ethylenically unsaturated double bond.

In the compound having an ethylenically unsaturated double bond, the structure of the ethylenically unsaturated double bond is not particularly limited. For example, there may be mentioned a (meth)acryloyl group, a vinyl group and an allyl group. From the viewpoint of ink curability, it is preferable that the ethylenically unsaturated double bond is a (meth)acryloyl group.

In the present invention, the compound having an ethylenically unsaturated double bond is preferably a monofunctional (meth)acrylate having only one (meth)acrylate group or a difunctional (meth)acrylate having two (meth)acrylate groups, from the viewpoint of obtaining low viscosity, excellent ink curability and small shrinkage upon curing. A monofunctional (meth)acrylate has low viscosity and shows small curing shrinkage, so that it is particularly suitable for applications that require flexibility. A difunctional (meth) acrylate has low viscosity and shows high cross-linking density upon curing, so that it is particularly suitable for applications that require resistance properties.

The monofunctional (meth)acrylate is not particularly limited. For example, there may be mentioned methyl(meth)acrylate, ethyl(meth)acrylate, n-propyl(meth)acrylate, isopropyl(meth)acrylate, n-butyl(meth)acrylate, sec-butyl (meth)acrylate, isobutyl(meth)acrylate, tert-butyl(meth) acrylate, n-pentyl(meth)acrylate, n-hexyl(meth)acrylate, 2-ethylhexyl(meth)acrylate, n-octyl(meth)acrylate, n-decyl (meth)acrylate, benzyl(meth)acrylate, phenyl(meth)acrylate, phenoxyethyl(meth)acrylate, cyclohexyl(meth)acrylate, tert-butylcyclohexyl(meth)acrylate, dicyclopentenyl (meth)acrylate, isobornyl(meth)acrylate, dicyclopentanyl (meth)acrylate, 1-adamantyl(meth)acrylate, allyl(meth) acrylate, 2,2'-oxybis(methylene)bis-2-propenoate, ethyl carbitol(meth)acrylate, glycidyl(meth)acrylate, 2-hydroxyethyl(meth)acrylate, 2-dimethylaminoethyl(meth)acrylate, acryloylmorpholine, N-acryloyloxyethyl hexahydrophthalimide, stearyl(meth)acrylate, isostearyl(meth)acrylate, and tridecyl(meth)acrylate.

From the viewpoint of small curing shrinkage and excellent adhesion, particularly preferred are aromatic hydrocarbon monofunctional (meth)acrylates such as benzyl(meth) acrylate, phenoxyethyl(meth)acrylate, and phenoxypolyethylene glycol(meth)acrylate; and alicyclic hydrocarbon monofunctional (meth)acrylates such as isobornyl(meth)acrylate, cyclohexyl(meth)acrylate, 3,3,5-trimethylcyclohexyl(meth)acrylate, 4-t-butylcyclohexyl (meth)acrylate, norbornyl(meth)acrylate, dicyclopentenyl (meth)acrylate, and dicyclopentanyl(meth)acrylate.

The difunctional (meth)acrylate is not particularly limited. For example, there may be mentioned ethylene glycol di(meth)acrylate, diethylene glycol di(meth)acrylate, dipropylene glycol di(meth)acrylate, tripropylene glycol di(meth) acrylate, hexanediol di(meth)acrylate, long-chain aliphatic di(meth)acrylate, 1,9-nonanediol di(meth)acrylate, neopentyl glycol di(meth)acrylate, hydroxypivalic acid neopentylglycol di(meth)acrylate, stearic acid-modified pentaerythritol di(meth)acrylate, propylene glycol di(meth)acrylate, glycerol di(meth)acrylate, triethylene glycol di(meth)acrylate, tetraethylene glycol di(meth)acrylate, tetramethylene glycol di(meth)acrylate, butylene glycol di(meth)acrylate, propoxylated neopentyl glycol di(meth)acrylate, dicyclopentanyl di(meth)acrylate, polyethylene glycol di(meth) acrylate, polypropylene di(meth)acrylate, triglycerol di(meth)acrylate, neopentyl glycol-modified trimethylolpropane di(meth)acrylate, allylcyclohexyl di(meth)acrylate, methoxycyclohexyl di(meth)acrylate, acrylated isocyanurate, bis(acryloxyneopentyl glycol)adipate, bisphenol A di(meth)acrylate, tetrabromo bisphenol A di(meth)acrylate, bisphenol S di(meth)acrylate, butanediol di(meth)acrylate, phthalic di(meth)acrylate, di(meth)acrylic-modified phosphoric acid ester, and zinc di(meth)acrylate.

From the viewpoint of obtaining low viscosity and high cross-linking density, the difunctional (meth)acrylate is preferably one or more components selected from the group consisting of dipropylene glycol di(meth)acrylate, tripropylene glycol di(meth)acrylate, 1,9-nonanediol di(meth)acrylate, tetraethylene glycol di(meth)acrylate and propoxylated neopentyl glycol diacrylate.

It is also possible to appropriately combine a monofunctional (meth)acrylate and a difunctional (meth)acrylate for use. In the case of using a monofunctional (meth)acrylate in combination with a difunctional (meth)acrylate, the content ratio can be appropriately adjusted depending on the intended use, and is not particularly limited. From the viewpoint of balancing adhesion and layer strength, the difunctional (meth)acrylate is preferably 0 to 60% by mass, more preferably 0 to 50% by mass, relative to the monofunctional (meth)acrylate.

In addition to the acryloyl group, a vinyl group is preferably used. A preferably used monofunctional vinyl monomer is N-vinylcaprolactam, since it has low viscosity and excellent adhesion. A preferred difunctional vinyl monomer is triethylene glycol divinyl ether, since it has low viscosity and is extremely capable of decreasing viscosity.

The above compound having an ethylenically unsaturated double bonds can be used alone or in combination of two or more. Since the inkjet ink composition of the present invention is preferably solventless, that is, preferably contains no organic solvent, the compound having an ethylenically unsaturated double bond generally serves as a solvent or dispersion medium. Therefore, it is preferable to select compounds having an ethylenically unsaturated double bond for use in combination, from the viewpoint of not only curability and cured layer properties, but also having inkjet suitability and capability of serving as the solvent or dispersion medium.

As for the compound having an ethylenically unsaturated double bond which is capable of serving as the solvent or dispersion medium, the unsaturated double bond equivalent per gram of the compound (hereinafter simply referred to as "unsaturated double bond equivalent" (g/eq)) is preferably 100 to 300 g/eq, more preferably 120 to 250 g/eq, from the viewpoint of low viscosity and improving affinity for those contained in the ink composition, such as dispersing agents and other ethylenically unsaturated double bonds.

The compound having an ethylenically unsaturated double bond which is capable of serving as the solvent or dispersion medium, can be appropriately selected from those that are liquid at room temperature (25° C.). For example, one with a molecular weight of 150 to 400 is suitably used.

From the viewpoint of preventing the inkjet ink composition from gelation, the compound having an ethylenically unsaturated double bond which is capable of serving as the solvent or dispersion medium, is preferably one that contains no hydroxyl group or carboxy group.

Also from the viewpoint of preventing the pigment dispersion liquid from gelation and viscosity increase, the acid value of the compound having an ethylenically unsaturated double bond is preferably 0.1% by mass or less, more preferably 0.05% by mass or less, in terms of acrylic acid. The acid value (% by mass) in terms of acrylic acid can be obtained by the following formula: (acid value of the compound having an ethylenically unsaturated double bond (mgKOH/g))/1,000×(molecular weight of acrylic acid)/(molecular weight of potassium hydroxide)×100.

From the viewpoint of low viscosity, viscosity stability and improving affinity for those contained in the ink composition such as dispersing agents and other ethylenically unsaturated double bonds, it is preferable to use such a compound having an ethylenically unsaturated double bond that the unsaturated double bond equivalent per gram of the compound is 100 to 300 g/eq and the acid value of the compound is 0.1% by mass or less in terms of acrylic acid.

Preferred concrete examples of the compound having an ethylenically unsaturated double bond which is capable of serving as the solvent or dispersion medium, include phenoxyethyl acrylate, isobornyl acrylate, t-butyl cyclohexyl acrylate, ethyl carbitol acrylate, dipropylene glycol diacrylate, tripropylene glycol diacrylate, 1,9-nonanediol diacrylate, propoxylated neopentyl glycol diacrylate and triethylene glycol divinyl ether.

The content of the compound having an ethylenically unsaturated double bond is not particularly limited. From the viewpoint of curability, in the pigment dispersion liquid for inkjet ink according to the present invention, the content of the compound having an ethylenically unsaturated double bond is preferably 10 to 93% by mass, more preferably 25 to 90% by mass, particularly preferably 40 to 86% by mass.

(Other Components)

The pigment dispersion liquid for inkjet ink according to the present invention can further contain other components. Examples of other components include a surfactant such as a silicon-based surfactant, a plasticizer, a surface conditioner, a UV inhibitor, a light stabilizer, an antioxidant and a polymerization inhibitor. In the present invention, repellency to ink ejection surface of the pigment dispersion liquid is further increased by further containing a compound having a polyalkylene oxide chain and/or an aliphatic hydrocarbon chain having 12 or more carbon atoms, wherein the compound can contain an amide group or can have an amino group at a terminal thereof, and the amino group can be a salt-forming amino group. Also in the present invention, the storage stability of the pigment dispersion liquid can be further increased by containing the below-described polymerization inhibitor.

[Compound Having a Polyalkylene Oxide Chain and/or an Aliphatic Hydrocarbon Chain Having 12 or More Carbon Atoms]

From the viewpoint of repellency to ink ejection surface, preferably, the pigment dispersion liquid of the present invention further contains a compound having a polyalkylene oxide chain and/or an aliphatic hydrocarbon chain having 12 or more carbon atoms. The compound can contain an amide group or can have an amino group at a terminal thereof, and the amino group can be a salt-forming amino group.

The above-specified compound can inhibit adsorption to the ink ejection surface, by interaction with polar or hydrophobic groups possessed by the pigment or the free pigment dispersing agent. Therefore, the above-specified compound is excellent repellency.

As the compound having a polyalkylene oxide chain and/or an aliphatic hydrocarbon chain having 12 or more carbon atoms, the following compounds are preferred: a compound having a polyalkylene oxide chain and having an amino group at a terminal; a compound having a polyalkylene oxide chain and a fatty acid-derived aliphatic hydrocarbon chain having 12 or more carbon atoms; and a compound having a fatty-acid derived aliphatic hydrocarbon chain having 12 or more carbon atoms and having an amino group at a terminal.

Examples of such compounds include "SOLSPERSE 20000" and "SOLSPERSE 9000" manufactured by Lubrizol Corporation and "DISPERBYK-191" manufactured by BYK Japan KK.

In the pigment dispersion liquid for inkjet ink according to the present invention, in the case of further using the compound having a polyalkylene oxide chain and/or an aliphatic hydrocarbon chain having 12 or more carbon atoms, from the viewpoint of repellency to ink ejection surface, the content of the compound is preferably 10 to 50 parts by mass, more preferably 20 to 35 parts by mass, relative to 100 parts by mass of the copolymer, etc., used as the pigment dispersing agent. These amounts are expressed in terms of solid content.

(Method for Producing Pigment Dispersion Liquid)

In the present invention, the method for producing the pigment dispersion liquid for inkjet ink is not particularly limited. In general, it is a method including a pigment dispersing step.

The pigment dispersing step is, for example, a step in which the compound having an ethylenically unsaturated double bond, which is suitable as the dispersion medium, is mixed with the pigment, the pigment dispersing agent and, as needed, other component(s); the mixture is agitated with a dissolver; and the agitated mixture is dispersed with zirconia beads, using a beads mill or the like. As needed, before the dispersion, a pre-dispersion can be carried out on the mixture with, for example, zirconia beads having a relatively large bead diameter. As needed, the thus-obtained dispersion is filtered through a membrane filter, etc., thus obtaining the pigment dispersion liquid for inkjet ink according to the present invention.

When other component is used and it is the compound having a polyalkylene oxide chain and/or an aliphatic hydrocarbon chain having 12 or more carbon atoms, the compound can be added at the time of or after dispersing the pigment. In both cases, excellent repellency to ink ejection surface can be provided to the inkjet ink composition.

<Active Energy Ray-Curable Inkjet Ink Composition>

The active energy ray-curable inkjet ink composition of the present invention contains the pigment dispersion liquid for inkjet ink according to the present invention and a photopolymerization initiator.

Due to the use of the pigment dispersion liquid for inkjet ink according to the present invention, the active energy ray-curable inkjet ink composition of the present invention is stable for a long period of storage at not only normal temperature but also high temperature, is excellent in repellency to ink ejection surface, and is less likely to cause clogging the inkjet device. The active energy ray-curable inkjet ink composition of the present invention contains substantially no solvent and has such a property that it is dried quickly by irradiation with active energy ray; therefore, the inkjet ink composition can be printed to media that do not have solvent resistance or do not absorb ink. An ink layer formed by curing the active energy ray-curable inkjet ink composition of the present invention, is a homogeneous layer; therefore, a high-quality printed product can be obtained.

The active energy ray-curable inkjet ink composition of the present invention contains at least a pigment, a pigment dispersing agent, a compound having an ethylenically unsaturated double bond, and a photopolymerization initiator. As needed, it can further contain other components.

Hereinafter, the components of the active energy ray-curable inkjet ink composition of the present invention will be explained in detail. The pigment, the pigment dispersion liquid and the compound having an ethylenically unsaturated double bond will not be explained here, since they are the same as those of the pigment dispersing agent described above.

(Photopolymerization Initiator)

The photopolymerization initiator used in the active energy ray-curable inkjet ink composition of the present invention, is not particularly limited as long as it can accelerate polymerization reaction of the compound having an ethylenically unsaturated double bond by irradiation with active energy ray. As the initiator, there may be used conventionally-known photopolymerization initiators.

Examples of photopolymerization initiators include aromatic ketones such as thioxanthone, α-aminoalkylphenones, α-hydroxyketones, acyl phosphine oxides, aromatic onium salts, organic peroxides, thio compounds, hexaarylbiimidazole compounds, ketoxime ester compounds, borate compounds, azinium compounds, metallocene compounds, active ester compounds, compounds having a carbon-halogen bond, and alkylamine compounds.

In the present invention, as the photopolymerization initiator, it is preferable to use one or more components selected from the group consisting of acyl phosphine oxides, α-hydroxyketones and α-aminoalkylphenones, from the viewpoint of accelerating polymerization reaction and increasing curability.

Examples of acyl phosphine oxides include bis(2,4,6-trimethylbenzoyl)-phenyl-phosphine oxide (such as "Irgacure 819" manufactured by BASF), bis(2,6-dimethoxybenzoyl)-2,4,4-trimethyl-pentylphenyl phosphine oxide, and 2,4,6-trimethylbenzoyl-diphenyl-phosphine oxide (such as "Darocur TPO" and "Lucirin TPO" manufactured by BASF).

Examples of α-hydroxyketones include 2-hydroxy-1-{4-[4-(2-hydroxy-2-methyl-propionyl)-benzyl]-phenyl}-2-methyl-propane-1-on (such as "Irgacure 127" manufactured by BASF), 2-hydroxy-4'-hydroxyethoxy-2-methylpropiophenone (such as "Irgacure 2959" manufactured by BASF), 1-hydroxy-cyclohexyl-phenyl-ketone (such as "Irgacure 184" manufactured by BASF) and oligo{2-hydroxy-2-methyl-1-[4-(1-methyl vinyl)phenyl]propanone}(such as "ESACURE ONE" manufactured by Lamberti).

Examples of aminoalkylphenones include 2-benzyl-2-dimethylamino-1-(4-morpholinophenyl)-butanone-1 (such as "Irgacure 369" manufactured by BASF) and 2-dimethylamino-2-[(4-methylphenyl)methyl]-1-[4-(4-morpholinyl)phenyl]-1-butanone (such as "Irgacure 379" manufactured by BASF).

Of them, 2,4,6-trimethylbenzoyl-diphenyl-phosphine oxide and 2-hydroxy-1-{4-[4-(2-hydroxy-2-methyl-propionyl)-benzyl]-phenyl}-2-methyl-propane-1-on are particularly effective for curability of thin layers produced by inkjet, since they are less likely to cause oxygen-induced inhibition of polymerization.

Also, 2,4,6-trimethylbenzoyl-diphenyl-phosphine oxide, 2-hydroxy-4'-hydroxyethoxy-2-methylpropiophenone, oligo{2-hydroxy-2-methyl-1-[4-(1-methyl vinyl)phenyl]propanone} and 2-benzyl-2-dimethylamino-1-(4-morpholinophenyl)-butanone-1,2-dimethylamino-2-[(4-methylphenyl)methyl]-1-[4-(4-morpholinyl)phenyl]-1-butanone are particularly effective for curability of thick layers, since they are excellent in internal curability. Especially, 2,4,6-trimethylbenzoyl-diphenyl-phosphine oxide is highly reactive with active energy ray; therefore, in the ink composition, it can be contained in an amount of 1 to 12% by mass, preferably 2 to 8% by mass.

Also in the present invention, it is preferable to combine acyl phosphine oxides, α-hydroxyketones and α-aminoalkylphenones for use, from the point of view that it gives both excellent thin layer curability and excellent thick layer curability, and the thus-obtained inkjet ink is highly sensitive to active energy ray and can be cured for a short period of time.

Of the above photopolymerization initiators, preferably used is one that exerts photosensitization effects (hereinafter may be referred to as "sensitizer"). By using such a photopolymerization initiator alone or in combination with other photopolymerization initiator, the inkjet ink composition can be cured with high sensitivity and for a short period of time, even in the case of using a light source that emits low irradiation energy per unit time, such as an LED light source.

The photopolymerization initiator that exerts photosensitization effects is not particularly limited. Examples thereof include aromatic ketones, alkylamine compounds and thio compounds.

Concrete examples of aromatic ketones include 2,4-diethylthioxanthone (such as "KAYACURE DETX-S" manufactured by Nippon Kayaku Co., Ltd.) and isopropylthioxanthone (such as "Chivacure ITX" manufactured by Double Bond Chemical Co., Ltd.)

Concrete examples of alkylamine compounds include p-ethyl dimethylaminobenzoate (such as "DAIDO UV-CURE EDB" manufactured by Daido Chemical Corporation) and 4,4'-bis(diethylamino)benzophenone (such as "EAB-SS" manufactured by Daido Chemical Corporation).

Concrete examples of thio compounds include 4-benzoyl-4'-methyl diphenyl sulfide (such as "SPEED CURE BMS" manufactured by Lambson) and 2-mercapto benzothiazole (such as "M" manufactured by Kawaguchi Chemical Industry Co., Ltd.)

As the sensitizer, it is preferable to use one or more components selected from the group consisting of 2,4-diethylthioxanthone, 4,4'-bis(diethylamino)benzophenone and 4-benzoyl-4'-methyl diphenyl sulfide.

In the inkjet ink composition of the present invention, it is preferable to use acyl phosphine oxides having absorption in the long wavelength range. It is more preferable to use 2,4,6-trimethylbenzoyl-diphenyl-phosphine oxide in combination with one or more components selected from the group consisting of 2,4-diethylthioxanthone, 4,4'-bis(diethylamino)benzophenone and 4-benzoyl-4'-methyl diphenyl sulfide, from the point of view that the inkjet ink composition can be cured with high sensitivity and for a short period of time, by exposure to a 385 nm LED source, a 395 nm LED source, or the like.

In the present invention, the above photopolymerization initiators can be used alone or in combination of two or more.

In the present invention, the content of the photopolymerization initiator is not particularly limited, as long as the effects of the present invention are not impaired. In the inkjet ink composition, the content of the photopolymerization initiator is preferably 2 to 20% by mass, more preferably 4 to 15% by mass, from the viewpoint of balancing curability and long-term storage stability. In the case of using two or more components of photopolymerization initiators in combination, the total content of the photopolymerization initiators is preferably within the above range.

(Other Components)

The active energy ray-curable inkjet ink composition of the present invention can further contain other components. For example, there may be mentioned those exemplified above under <Pigment dispersion liquid for inkjet ink> and a sensitizer.

By containing a polymerization inhibitor, the storage stability of the active energy ray-curable inkjet ink of the present invention can be increased further.

[Polymerization Inhibitor]

In the present invention, the polymerization inhibitor is not particularly limited, and there may be used conventionally-known polymerization inhibitors. Examples thereof include known hindered amine-type polymerization inhibitors, hindered phenol-type polymerization inhibitors, quinone-type polymerization inhibitors, nitrosamine-type polymerization inhibitors and phenothiazine-type polymerization inhibitors. In the present invention, from the viewpoint of increasing storage stability, as the polymerization inhibitor, it is preferable to use a nitrosamine-type polymerization inhibitor and/or a phenothiazine-type polymerization inhibitor, and it is more preferable to use a nitrosamine-type polymerization inhibitor in combination with a phenothiazine-type polymerization inhibitor.

Examples of hindered amine-type polymerization inhibitors include bis(1-oxyl-2,2,6,6-tetramethylpiperidin-4-yl)sebacate and decanedioic acid bis(2,2,6,6-tetramethyl-1-(octyloxy)-4-piperidinyl)ester. Preferred is bis(1-oxyl-2,2,6,6-tetramethylpiperidin-4-yl)sebacate. Commercially-available hindered amine-type polymerization inhibitors include "IRGASTAB UV10" and "TINUVIN 292", both of which are manufactured by Ciba.

Examples of hindered phenol-type polymerization inhibitors include 2,6-di-tert-butylphenol, 2-tert-butyl-4,6-dimethylphenol, 2,6-di-tert-butyl-4-methylphenol and 2,4,6-tritert-butylphenol. Preferred are 2,6-di-tert-butylphenol and 2,6-di-tert-butyl-4-methylphenol.

Examples of quinone-type polymerization inhibitors include 2,5-di-tert-butyl-1,4-benzoquinone, 2,6-di-tert-butyl-1,4-benzoquinone, 2,5-di-tert-amylbenzoquinone, 2-tert-butyl-1,4-benzoquinone, 2,5-cyclohexadiene-1-one and 2,6-bis(1,1-dimethylethyl)-4-(phenylethylene)-(9Cl). Preferred are 2,5-cyclohexadiene-1-one and 2,6-bis(1,1-dimethylethyl)-4-(phenylethylene)-(9Cl). Commercially-available quinone-type polymerization inhibitors include "IRGASTAB UV22" manufactured by BASF, for example.

A phenothiazine-type polymerization inhibitor is a polymerization inhibitor containing phenothiazine and a derivative thereof. By using the phenothiazine-type polymerization inhibitor, less yellowing is observed even after a long period of storage. Particularly in the case of an inkjet ink composition containing no pigment, the use of the phenothiazine-type polymerization inhibitor can make the inkjet ink composition a clear composition with no yellowing. Also, the use of the phenothiazine-type polymerization inhibitor can prevent gelation, poor dispersion stability, and viscosity increase, which are caused by use in heating conditions or by temperature increase due to friction during dispersion.

Concrete examples of phenothiazine-type polymerization inhibitors include phenothiazine, 2-methoxyphenothiazine, 2-cyanophenothiazine, bis(α-methylbenzyl) phenothiazine, 3,7-dioctylphenothiazine and bis(α,α-dimethylbenzyl)phenothiazine. In the present invention, the phenothiazine-type polymerization inhibitor is preferably phenothiazine, 2-methoxyphenothiazine or 2-cyanophenothiazine.

A nitrosamine-type polymerization inhibitor is a polymerization inhibitor containing nitrosamine and a nitrosamine derivative. The nitrosamine-type polymerization inhibitor shows excellent radical scavenging ability under an oxygen-free atmosphere. Moreover, since nitrosamine can neutralize free acids, the nitrosamine-type polymerization inhibitor can inhibit acid-induced polymerization reaction. Even at high temperature, the nitrosamine-type polymerization inhibitor can achieve the above functions and inhibit polymerization reaction.

Examples of nitrosamine-type polymerization inhibitors include N-nitroso-N-phenylhydroxylamineammonium salt, N-nitroso-N-phenylhydroxylaminealuminum salt, N-nitroso-N-phenylhydroxylaminecerium salt, N-nitroso-N-phenylhydroxylaminesodium salt, N-nitroso-diphenylamine, N-nitroso-N-cyclohexylaniline, N-nitroso-N-methylaniline and N-nitrosodimethylamine. Preferred are N-nitroso-N-phenylhydroxylamineammonium salt, N-nitroso-N-phenylhydroxylaminealuminum salt, N-nitroso-N-phenylhydroxylaminecerium salt and N-nitroso-N-phenylhydroxylaminesodium salt.

By using, as the polymerization inhibitor, the phenothiazine-type polymerization inhibitor in combination with the nitrosamine-type polymerization inhibitor, an active energy ray-curable inkjet ink composition can be obtained, which is stable for a long period of time under an oxygen-free atmosphere or in the presence of oxygen, is able to inhibit viscosity change, is able to prevent gelation or viscosity increase upon heating, and has excellent curability.

The mechanism to exert the above effects by using the phenothiazine-type polymerization inhibitor in combination with the nitrosamine-type polymerization inhibitor as the polymerization inhibitor, is not clear yet; however, it is estimated as follows.

Under an oxygen-free atmosphere and in the presence of oxygen, the active energy ray-curable inkjet ink composition containing, as the polymerization inhibitor, the phenothiazine-type polymerization inhibitor and the nitrosamine-type polymerization inhibitor, can prevent generation of radicals in the ink composition or scavenge radicals generated in the ink composition, so that the ink composition can sufficiently inhibit polymerization reaction of the ethylenically unsaturated double bond, by the synergistic effect of the phenothiazine-type polymerization inhibitor and the nitrosamine-type polymerization inhibitor. In the case of heating the ink composition, radicals are more likely to be generated and gelation or viscosity increase is likely to occur. By using the phenothiazine-type polymerization inhibitor in combination with the nitrosamine-type polymerization inhibitor, polymerization reaction of the ethylenically unsaturated double bond can be sufficiently inhibited even upon heating. Therefore, in the cases of storage under an oxygen-free atmosphere, use in the presence of oxygen and heating, the polymerization reaction of the ethylenically unsaturated double bond in the ink composition is inhibited, so that the ink composition is stable for a long period of time and can inhibit viscosity change. Also, by the above-mentioned synergistic effect, the ink composition containing the phenothiazine-type polymerization inhibitor and the nitrosamine-type polymerization inhibitor as the polymerization inhibitor, can sufficiently inhibit polymerization reaction, even when the content of the polymerization inhibitor in the ink composition is smaller than ever before. Therefore, when irradiated with active energy ray, the photopolymerization initiator efficiently works, so that polymerization reaction of the ethylenically unsaturated double bond is sufficiently accelerated, thus obtaining excellent curability.

The active energy ray-curable inkjet ink composition containing, as the polymerization inhibitor, the phenothiazine-type polymerization inhibitor and the nitrosamine-type polymerization inhibitor is, as described above, stable in the presence of oxygen and under an oxygen-free atmosphere; therefore, while in use, the ink composition causes no clogging in a path or at a head and has excellent ejection stability. In the case of using active energy ray-curable inkjet ink compositions, it is often carried out to decrease the viscosity and thus to increase the ejection performance, by heating an inkjet head or the like to 30 to 50° C. However, the active energy ray-curable inkjet ink composition containing the phenothiazine-type polymerization inhibitor and the nitrosamine-type polymerization inhibitor as the polymerization inhibitor, shows excellent stability also in heating, so that the ink composition causes no clogging even in the case of using such a method. From these points, the printed product obtained by using the ink composition has a homogeneous ink layer and is a high-quality printed product, therefore.

The above polymerization inhibitors can be used alone or in combination of two or more. The content of the polymerization inhibitor is not particularly limited. From the viewpoint of efficiently inhibiting polymerization reaction of the compound having an ethylenically unsaturated double bond and obtaining excellent ink curability, the content of the polymerization inhibitor is preferably 0.002 to 0.4% by mass, more preferably 0.021 to 0.150% by mass, still more preferably 0.025 to 0.120% by mass, in the inkjet ink composition.

In the case of using the phenothiazine-type polymerization inhibitor as the polymerization inhibitor, the content is not particularly limited. From the viewpoint of efficiently inhibiting polymerization reaction of the compound having an ethylenically unsaturated double bond and obtaining excellent ink curability, the content is preferably 0.001 to 0.2% by mass, more preferably 0.01 to 0.1% by mass, still more preferably 0.02 to 0.05% by mass, in the inkjet ink composition.

In the case of using the nitrosamine-type polymerization inhibitor as the polymerization inhibitor, the content is not particularly limited. From the viewpoint of efficiently inhibiting polymerization reaction of the compound having an ethylenically unsaturated double bond and obtaining excellent ink curability, the content is preferably 0.001 to 0.2% by mass, more preferably 0.002 to 0.1% by mass, still more preferably 0.005 to 0.05% by mass, in the inkjet ink composition.

From the viewpoint of long-term stability both under an oxygen-free atmosphere and in the presence of oxygen and also from the viewpoint of excellent curability, it is preferable that the active energy ray-curable inkjet ink composition of the present invention contains, as the polymerization inhibitor, the phenothiazine-type polymerization inhibitor and the nitrosamine-type polymerization inhibitor, and the content of the phenothiazine-type polymerization inhibitor in the inkjet ink composition is 0.001 to 0.2% by mass, and the content of the nitrosamine-type polymerization inhibitor in the inkjet ink composition is 0.001 to 0.2% by mass.

In the active energy ray-curable inkjet ink composition containing, as the polymerization inhibitor, the phenothiazine-type polymerization inhibitor and the nitrosamine-type polymerization inhibitor, the content ratio of the phenothiazine-type polymerization inhibitor and the nitrosamine-type polymerization inhibitor can be appropriately adjusted and is not particularly limited. From the viewpoint of efficiently inhibit polymerization reaction of the compound having an ethylenically unsaturated double bond and obtaining excellent ink layer curability, the content ratio of the nitrosamine-type polymerization inhibitor is preferably 5 to 250 parts by mass, more preferably 10 to 200 parts by mass, relative to 100 parts by mass of the phenothiazine-type polymerization inhibitor.

The ink composition containing the phenothiazine-type polymerization inhibitor and the nitrosamine-type polymerization inhibitor as the polymerization inhibitor, can further contain a different polymerization inhibitor. For example, there may be mentioned the above-described hindered amine-type polymerization inhibitor, hindered phenol-type polymerization inhibitor and quinone-type polymerization inhibitor. The content of the different polymerization inhibitor is preferably 10% by mass or less of the whole polymerization inhibitor, and it is more preferable that polymerization inhibitors other than the phenothiazine-type polymerization inhibitor and the nitrosamine-type polymerization inhibitor are not substantially contained in the ink composition.

(Viscosity and Surface Tension of the Active Energy Ray-Curable Inkjet Ink Composition)

The inkjet ink composition of the present invention preferably has a viscosity of 5 to 20 mPa·s at 40° C., from the viewpoint of inkjet ejection performance and ejection stability.

Also, the inkjet ink composition of the present invention preferably has a surface tension of 20 to 40 mN/m at 40° C., from the viewpoint of inkjet ejection performance, ejection stability and leveling properties onto a substrate.

(Content Ratio of the Components in the Active Energy Ray-Curable Inkjet Ink Composition)

In the active energy ray-curable inkjet ink composition of the present invention, from the viewpoint of balancing dispersibility and tinting strength, the content of the pigment is preferably 0.1 to 40% by mass, more preferably 0.2 to 20% by mass, in the inkjet ink composition. In the case of the organic pigment, the content is preferably 0.1 to 20% by mass, more preferably 0.2 to 10% by mass. In the case of the inorganic pigment, from the viewpoint of balancing dispersibility and tinting strength, the content is preferably 1 to 40% by mass, more preferably 5 to 20% by mass.

In the inkjet ink composition, the content ratio of the pigment dispersing agent is not particularly limited, and it varies depending on the type of the pigment. The pigment dispersing agent is generally 20 to 60 parts by mass, relative to 100 parts by mass of the pigment. From the viewpoint of dispersibility and dispersion stability, the pigment dispersing agent is preferably 25 to 55 parts by mass, more preferably 30 to 50 parts by mass, relative to 100 parts by mass of the pigment.

In the inkjet ink composition, the content of the compound having an ethylenically unsaturated double bond is not particularly limited. From the viewpoint of curability, the content of the compound having an ethylenically unsaturated double bond in the inkjet ink composition of the present invention, is preferably 30 to 95% by mass, more preferably 45 to 95% by mass, particularly preferably 60 to 90% by mass.

In the inkjet ink composition, the content of the pigment dispersing agent is not particularly limited. In the inkjet ink composition, the content of the pigment dispersing agent is preferably 0.02 to 24% by mass, particularly preferably 0.03 to 20% by mass, more preferably 0.06 to 10% by mass. When the content of the pigment dispersing agent is small, there is a possibility that no steric protection layer is formed and the pigment aggregates. When the content is too large, there is a possibility that the viscosity of the ink composition is increased and the ejection performance of the ink composition is deteriorated.

In the inkjet ink composition of the present invention, no particular limitation is imposed on the content of the pigment dispersing agent which has an amine value of 20 mgKOH/g or less and an acid value of 10 mgKOH/g or less, and which contains one or more components selected from the group consisting of: the copolymer having the styrene-derived repeating unit, the repeating unit derived from the unsaturated fatty acid having 12 or more carbon atoms, and the repeating unit derived from the polyalkylene oxide having an ethylenically unsaturated double bond; an alkali metal salt of the copolymer; an alkaline-earth metal salt of the copolymer; an ammonium salt of the copolymer; and an amine derivative of the copolymer. In the inkjet ink composition, the content of the copolymer, etc., is preferably 0.02 to 24% by mass, particularly preferably 0.03 to 20% by mass, more preferably 0.06 to 10% by mass. When the content of the copolymer, etc., is small, there is a possibility that no steric protection layer is formed and the pigment aggregates. When the content is too large, there is a possibility that the viscosity of the ink composition is increased and the ejection performance of the ink composition is deteriorated. The content of the pigment dispersing agent and that of the copolymer, etc., are in terms of solid content.
(Method for Producing the Active Energy Ray-Curable Inkjet Ink Composition)

The method for producing the active energy ray-curable inkjet ink composition of the present invention is not particularly limited. The inkjet ink composition can be obtained by adding the photopolymerization initiator and, as needed, the polymerization inhibitor, etc., to the pigment dispersion liquid for inkjet ink according to the present invention, and agitating the mixture until it is homogeneous.
<Printed Product>

The printed product of the present invention contains a layer formed by curing the active energy ray-curable inkjet ink composition of the present invention on a recording medium.

The printed product of the present invention is a high-quality printed product with excellent reproducibility, by using the active energy ray-curable inkjet ink composition with excellent storage stability and excellent curability.

Hereinafter, the printed product of the present invention will be described. However, the active energy ray-curable inkjet ink composition will not be described here since it is as described above.
(Recording Medium)

In the printed product of the present invention, the recording medium is not particularly limited. For example, there may be mentioned non-ink-absorbing resins such as polyethylene terephthalate resin, polypropylene resin, acrylic resin, polycarbonate resin, polystyrene resin and polyvinyl chloride resin; synthetic papers; glasses; metals; and rubbers.
(Method for Producing the Printed Product)

The method for producing the printed product is not particularly limited. It is preferable to use an inkjet recording method including the steps of ejecting the inkjet ink composition of the present invention onto the recording medium and curing the ejected inkjet ink composition by irradiation with active energy ray.

These steps will be described hereinafter.
(1) Step of Ejecting the Inkjet Ink Composition onto the Recording Medium In this step, generally, the inkjet ink composition is ejected onto the recording medium by an inkjet method. A desired image can be drawn by ejecting the inkjet ink composition, or a clear layer can be formed over a relatively wide range by ejecting the inkjet ink composition. In the present invention, due to the use of the inkjet ink composition of the present invention with excellent stability and resistance to viscosity change, excellent ejection stability is obtained.
(2) Step of Curing the Inkjet Ink Composition by Irradiation with Active Energy Ray The type of the active energy ray is appropriately selected depending on the combination with the photopolymerization initiator and is not particularly limited. For example, ultraviolet light at a wavelength of 365 nm is suitably used.

In the case of ultraviolet irradiation, the light source of the active energy ray can be a high-pressure mercury lamp, metal halide lamp, low-pressure mercury lamp, ultra high pressure mercury lamp, ultraviolet laser, light emitting diode (LED) or the like, and it is not particularly limited.

It is preferable that the inkjet ink composition is irradiated with active energy ray immediately after impacting the recording medium.

EXAMPLES

Hereinafter, the present invention will be described in more detail, by way of examples. However, the scope of the present invention is not restricted by the examples. It is to be noted that in the following examples, "part" or "parts" means "part by mass" or "parts by mass". Also, a pigment dispersing agent for which no solid content ratio is described has a solid content of 100% by mass.

Example 1

Preparation of Yellow Pigment Dispersion Liquid

First, 10.7 parts of a pigment dispersing agent which contains one or more components selected from the group consisting of: a copolymer having a styrene-derived repeating unit, a repeating unit derived from an unsaturated fatty acid having 16 carbon atoms and an unsaturated fatty acid having 18 carbon atoms, and a repeating unit derived from a polyalkylene oxide having an ethylenically unsaturated double bond and being 10 to 60 mol relative to the repeating units derived from the unsaturated fatty acids; an alkali metal salt of the copolymer; an alkaline-earth metal salt of the copolymer; an ammonium salt of the copolymer; and an amine derivative of the copolymer (i.e., "BYKJET-9150" manufactured by BYK Japan KK, amine value 12 mgKOH/g, acid value 5 mgKOH/g, solid content about 70% by mass) was dissolved in 74.2 parts of dipropylene glycol diacrylate ("SR508" manufactured by Sartomer, unsaturated double bond equivalent 121 g/eq, acid value 0.05% by mass (in terms of acrylic acid)). Then, 15 parts of Pigment Yellow 155 (yellow pigment "PY155" manufactured by Clariant Corp.) and 0.1 part of phenothiazine ("TDP" manufactured by Kawaguchi Chemical Industry Co., Ltd.) was added thereto and dispersed with a paint shaker using 1 mm-diameter zirconia beads so that the pigment particle diameter (median diameter) is 200 nm or less, thus obtaining the yellow pigment dispersion liquid of Example 1. The particle diameter was measured by "FPAR-1000" manufactured by Otsuka Electronics Co., Ltd.

Example 2

Preparation of Yellow Pigment Dispersion Liquid

The yellow pigment dispersion liquid of Example 2 was obtained in the same manner as Example 1, except that 74.2 parts of isobornyl acrylate ("ZA-IBXA" manufactured by Kyoeisha Chemical Co., Ltd., unsaturated double bond equivalent 208 g/eq, acid value 0.003% by mass (in terms of acrylic acid)) was used in place of SR508.

Example 3

Preparation of Yellow Pigment Dispersion Liquid

The yellow pigment dispersion liquid of Example 3 was obtained in the same manner as Example 1, except that 74.2 parts of phenoxyethyl acrylate ("SR339A" manufactured by Sartomer, unsaturated double bond equivalent 192 g/eq, acid value 0.02% by mass (in terms of acrylic acid)) was used in place of SR508.

Example 4

Preparation of Yellow Pigment Dispersion Liquid

The yellow pigment dispersion liquid of Example 4 was produced as follows. A dispersion liquid was obtained in the same manner as Example 1, except that 72.7 parts of SR508 was used. The dispersion liquid was mixed with 1.5 parts of a compound having a polyalkylene oxide chain and having an amino group at a terminal ("SOLSPERSE 20000" manufactured by Lubrizol Corporation (hereinafter may be referred to as "S20000")) and agitated, thus obtaining the yellow pigment dispersion liquid of Example 4.

Comparative Example 1

Preparation of Yellow Pigment Dispersion Liquid

The yellow pigment dispersion liquid of Comparative Example 1 was obtained in the same manner as Example 1, except that 77.4 parts of SR508 was used and 7.5 parts of a basic pigment dispersing agent having a comb-shaped skeleton ("SOLSPERSE 24000" manufactured by Lubrizol Corporation, amine value 42 mgKOH/g, acid value 25 mgKOH/g (hereinafter may be referred to as "S24000")) was used in place of BYKJET-9150.

Comparative Example 2

Preparation of Yellow Pigment Dispersion Liquid

The yellow pigment dispersion liquid of Comparative Example 2 was obtained in the same manner as Example 1, except that 77.4 parts of SR508 was used and 7.5 parts of a basic pigment dispersing agent having a comb-shaped skeleton ("SOLSPERSE 32000" manufactured by Lubrizol Corporation, amine value 31 mgKOH/g, acid value 15 mgKOH/g (hereinafter may be referred to as "S32000")) was used in place of BYKJET-9150.

Comparative Example 3

Preparation of Yellow Pigment Dispersion Liquid

The yellow pigment dispersion liquid of Comparative Example 3 was obtained in the same manner as Example 1, except that 77.4 parts of SR508 was used and 7.5 parts of a basic pigment dispersing agent having a comb-shaped skeleton ("SOLSPERSE 33000" manufactured by Lubrizol Corporation, amine value 41 mgKOH/g, acid value 26 mgKOH/g (hereinafter may be referred to as "S33000")) was used in place of BYKJET-9150.

Comparative Example 4

Preparation of Yellow Pigment Dispersion Liquid

The yellow pigment dispersion liquid of Comparative Example 4 was obtained in the same manner as Example 1, except that 77.4 parts of SR508 was used and 7.5 parts of a basic pigment dispersing agent having a comb-shaped skeleton ("SOLSPERSE 39000" manufactured by Lubrizol Corporation, amine value 29 mgKOH/g, acid value 33 mgKOH/g (hereinafter may be referred to as "S39000")) was used in place of BYKJET-9150.

Comparative Example 5

Preparation of Yellow Pigment Dispersion Liquid

The yellow pigment dispersion liquid of Comparative Example 5 was obtained in the same manner as Example 1, except that 77.4 parts of SR508 was used and 7.5 parts of a basic pigment dispersing agent having a comb-shaped skeleton ("PB821" manufactured by Ajinomoto Fine-Techno. Co., Inc., amine value 9 mgKOH/g, acid value 13 mgKOH/g) was used in place of BYKJET-9150.

Comparative Example 6

Preparation of Yellow Pigment Dispersion Liquid

The yellow pigment dispersion liquid of Comparative Example 6 was obtained in the same manner as Example 1, except that 77.4 parts of SR508 was used and 7.5 parts of a basic pigment dispersing agent having a comb-shaped skeleton ("PB881" manufactured by Ajinomoto Fine-Techno. Co., Inc., amine value 17 mgKOH/g, acid value 17 mgKOH/g) was used in place of BYKJET-9150.

Comparative Example 7

Preparation of Yellow Pigment Dispersion Liquid

The yellow pigment dispersion liquid of Comparative Example 7 was obtained in the same manner as Example 1, except that 77.4 parts of SR508 was used and 7.5 parts of a basic pigment dispersing agent having a comb-shaped structure ("BYK-9076" manufactured by BYK Japan KK, amine value 44 mgKOH/g, acid value 38 mgKOH/g) was used in place of BYKJET-9150.

Comparative Example 8

Preparation of Yellow Pigment Dispersion Liquid

The yellow pigment dispersion liquid of Comparative Example 8 was obtained in the same manner as Example 1, except that 77.4 parts of SR508 was used and 7.5 parts of an acidic pigment dispersing agent having a comb-shaped skeleton ("DISPERBYK-145" manufactured by BYK Japan KK, amine value 71 mgKOH/g, acid value 76 mgKOH/g) was used in place of BYKJET-9150.

Comparative Example 9

Preparation of Yellow Pigment Dispersion Liquid

The yellow pigment dispersion liquid of Comparative Example 9 was obtained in the same manner as Example 1, except that 59.9 parts of SR508 was used and 25 parts of a basic pigment dispersing agent having a comb-shaped skeleton ("DISPERBYK-168" manufactured by BYK Japan KK, amine value 11 mgKOH/g, solid content about 30% by mass) was used in place of BYKJET-9150.

<Temporal Stability Evaluation (1) of Dispersion Liquids>

The viscosity of the above-obtained yellow pigment dispersion liquids of Examples 1 to 4 and Comparative Examples 1 to 9 was measured with an AMVn viscometer manufactured by Anton Paar, under a temperature condition of 40° C.

Also, 40 cc of each yellow pigment dispersion liquid was put in a 50 cc glass bottle and stored at 60° C. for 7 days. After the storage, the viscosity of the pigment dispersion liquids was measured by the same method as above. Next, the rate of change in the viscosity of the dispersion liquids after the storage to the viscosity of the dispersion liquids before the storage, was obtained to evaluate the temporal stability of the dispersion liquids. The evaluation results are shown in Table 1.

[Temporal Stability Evaluation Criterion]
A: Change rate is −5% or more and less than +5%.
B: Change rate is 5% or more and less than 10%.
C: Change rate is 10% or more and less than 20%.
D: Change rate is 20% or more.

When the evaluation result is "A", the pigment dispersion liquid is particularly excellent in temporal stability. When the evaluation result is "B", the pigment dispersion is usable with no problem in practical use.

<Evaluation of Repellency to Ink Ejection Surface>

First, 40 cc of each of the above-obtained yellow pigment dispersion liquids of Examples 1 to 4 and Comparative Examples 1 to 9, was put in a 50 cc glass bottle. A nozzle material manufactured by KYOCERA Corporation (SUS430 with a water-repellent film) was immersed therein for 7 days at 60° C. After the immersion, the nozzle material was removed therefrom and measured for the number of seconds needed by the dispersion liquid to run down the nozzle material when the material was inclined at a 45-degree angle. The evaluation results are shown in Table 1.

[Criterion for Evaluation of Repellency]
A: Ran down the nozzle material for less than 5 seconds
B: Ran down the nozzle material for 5 seconds or more and less than 10 seconds
C: Ran down the nozzle material for 10 seconds or more
D: Attached to the nozzle material When the evaluation result is "A", the pigment dispersion liquid is particularly excellent in repellency. When the evaluation result is "B", the pigment dispersion liquid is usable with no problem in practical use.

TABLE 1

Yellow pigment dispersion liquids

| Materials | Material name | Example 1 | Example 2 | Example 3 | Example 4 | Comparative Example 1 | Comparative Example 2 | Comparative Example 3 |
|---|---|---|---|---|---|---|---|---|
| Pigment | PY155 | 15 | 15 | 15 | 15 | 15 | 15 | 15 |
| Pigment dispersing agent | BYKJET-9150 | 10.7 | 10.7 | 10.7 | 10.7 | | | |
| | S24000 | | | | | 7.5 | | |
| | S32000 | | | | | | 7.5 | |
| | S33000 | | | | | | | 7.5 |
| | S39000 | | | | | | | |
| | PB821 | | | | | | | |
| | PB881 | | | | | | | |
| | BYK-9076 | | | | | | | |
| | DISPERBYK-145 | | | | | | | |
| | DISPERBYK-168 | | | | | | | |
| Polymer Compound having an ethylenically unsaturated double bond | S20000 | | | | 1.5 | | | |
| | SR508 | 74.2 | | | 72.7 | 77.4 | 77.4 | 77.4 |
| | ZA-IBXA | | 74.2 | | | | | |
| | SR339A | | | 74.2 | | | | |
| Polymerization inhibitor | TDP | 0.1 | 0.1 | 0.1 | 0.1 | 0.1 | 0.1 | 0.1 |
| Evaluation | Initial viscosity | 65 | 32 | 70 | 66 | 122 | 84 | 78 |
| | Temporal stability (1) | −3% | 2% | −2% | −3% | >100% | >100% | >100% |
| | Temporal stability (1) evaluation | A | A | A | A | D | D | D |
| | Repellency | A | A | A | A | C | C | C |

| Materials | Material name | Comparative Example 4 | Comparative Example 5 | Comparative Example 6 | Comparative Example 7 | Comparative Example 8 | Comparative Example 9 |
|---|---|---|---|---|---|---|---|
| Pigment | PY155 | 15 | 15 | 15 | 15 | 15 | 15 |
| Pigment dispersing agent | BYKJET-9150 | | | | | | |
| | S24000 | | | | | | |
| | S32000 | | | | | | |
| | S33000 | | | | | | |
| | S39000 | 7.5 | | | | | |
| | PB821 | | 7.5 | | | | |
| | PB881 | | | 7.5 | | | |
| | BYK-9076 | | | | 7.5 | | |
| | DISPERBYK-145 | | | | | 7.5 | |
| | DISPERBYK-168 | | | | | | 25 |

TABLE 1-continued

| | | Yellow pigment dispersion liquids | | | | | |
|---|---|---|---|---|---|---|---|
| Polymer Compound having an ethylenically unsaturated double bond | S20000 SR508 ZA-IBXA SR339A | 77.4 | 77.4 | 77.4 | 77.4 | 77.4 | 59.9 |
| Polymerization inhibitor | TDP | 0.1 | 0.1 | 0.1 | 0.1 | 0.1 | 0.1 |
| Evaluation | Initial viscosity | 62 | 78 | 104 | 51 | 44 | 38 |
| | Temporal stability (1) | >100% | >100% | >100% | >100% | >100% | 11% |
| | Temporal stability (1) evaluation | D | D | D | D | D | C |
| | Repellency | D | C | C | D | D | D |

From the results shown in Table 1, it is clear that the pigment dispersion liquid containing the compound having an ethylenically unsaturated double bond as the dispersion medium and the pigment dispersing agent containing one or more components selected from the group consisting of: a copolymer having a styrene-derived repeating unit, a repeating unit derived from an unsaturated fatty acid having 12 or more carbon atoms, and a repeating unit derived from a polyalkylene oxide having an ethylenically unsaturated double bond; an alkali metal salt of the copolymer; an alkaline-earth metal salt of the copolymer; an ammonium salt of the copolymer; and an amine derivative of the copolymer, is excellent in temporal stability and repellency to ink ejection surface.

Particularly, the pigment dispersion liquid of Example 4, which is a pigment dispersion liquid that contains a compound having a polyalkylene oxide chain and/or an aliphatic hydrocarbon chain having 12 or more carbon atoms, took 2 to 3 seconds in the repellency test and this is a result that is more excellent than Examples 1 to 3, which took 3 to 4 seconds in the same test.

Example 5

Preparation of Magenta Pigment Dispersion Liquid

The magenta pigment dispersion liquid of Example 5 was obtained in the same manner as Example 1, except that 9.4 parts of BYKJET-9150 was used; 22 parts of Pigment Red 122 (magenta pigment "PR122" manufactured by DIC Corporation) was used in place of PY155; and 68.5 parts of phenoxyethyl acrylate ("SR339A" manufactured by Sartomer) was used in place of SR508.

Example 6

Preparation of Magenta Pigment Dispersion Liquid

The magenta pigment dispersion liquid of Example 6 was obtained in the same manner as Example 5, except that 68.5 parts of SR508 was used in place of SR339A.

Example 7

Preparation of Magenta Pigment Dispersion Liquid

First, a dispersion liquid was obtained in the same manner as Example 5, except that 66.3 parts of SR339A was used. Then, to the dispersion liquid, 2.2 parts of a compound having a polyalkylene oxide chain and a fatty acid-derived aliphatic hydrocarbon having 12 or more carbon atoms ("SOLSPERSE 20000" manufactured by Lubrizol Corporation) was added and agitated, thus obtaining the magenta pigment dispersion liquid of Example 7.

Example 8

Preparation of Magenta Pigment Dispersion Liquid

A dispersion liquid was obtained in the same manner as Example 5, except that 66.3 parts of SR508 was used in place of SR339A. Then, to the dispersion liquid, 2.2 parts of SOLSPERSE 20000 was added and agitated, thus obtaining the magenta pigment dispersion liquid of Example 8.

Example 9

Preparation of Magenta Pigment Dispersion Liquid

A dispersion liquid was obtained in the same manner as Example 5, except that 66.3 parts of SR508 was used in place of SR339A. Then, to the dispersion liquid, 2.2 parts of a compound having a polyalkylene oxide chain and having an amino group at a terminal ("SOLSPERSE 9000" manufactured by Lubrizol Corporation, hereinafter may be referred to as "S9000") was added and agitated, thus obtaining the magenta pigment dispersion liquid of Example 9.

Comparative Example 10

Preparation of Magenta Pigment Dispersion Liquid

The magenta pigment dispersion liquid of Comparative Example 10 was obtained in the same manner as Example 5, except that 11 parts of SOLSPERSE 33000 was used in place of BYKJET-9150, and 66.9 parts of SR508 was used in place of SR339A.

The temporal stability evaluation (1) and the repellency evaluation were carried out in the same manner as above, on the magenta pigment dispersion liquids of Examples 5 to 9 and Comparative Example 10. The results are shown in Table 2.

TABLE 2

Magenta pigment dispersion liquids

| Materials | Material name | Example 5 | Example 6 | Example 7 | Example 8 | Example 9 | Comparative Example 10 |
|---|---|---|---|---|---|---|---|
| Pigment | PR122 | 22 | 22 | 22 | 22 | 22 | 22 |
| Pigment dispersing agent | BYKJET-9150 | 9.4 | 9.4 | 9.4 | 9.4 | 9.4 | |
| | S33000 | | | | | | 11 |
| Polymer | S20000 | | | 2.2 | 2.2 | | |
| | S9000 | | | | | 2.2 | |
| Compound having an ethylenically unsaturated double bond | SR339A | 68.5 | | 66.3 | | | |
| | SR508 | | 68.5 | | 66.3 | 66.3 | 66.9 |
| Polymerization inhibitor | TDP | 0.1 | 0.1 | 0.1 | 0.1 | 0.1 | 0.1 |
| Evaluation | Initial viscosity | 150 | 125 | 155 | 130 | 125 | 170 |
| | Temporal stability (1) | 4% | −3% | 4% | −2% | 3% | 15% |
| | Temporal stability (1) evaluation | A | A | A | A | A | C |
| | Repellency | B | B | A | A | A | C |

From the results shown in Table 2, it is clear that as well as the pigment dispersion liquid using PY155, the pigment dispersion liquid using PR122, which contains the compound having an ethylenically unsaturated double bond as the dispersion medium and the pigment dispersing agent containing one or more components selected from the group consisting of: a copolymer having a styrene-derived repeating unit, a repeating unit derived from an unsaturated fatty acid having 12 or more carbon atoms, and a repeating unit derived from a polyalkylene oxide having an ethylenically unsaturated double bond; an alkali metal salt of the copolymer; an alkaline-earth metal salt of the copolymer; an ammonium salt of the copolymer; and an amine derivative of the copolymer, is also excellent in temporal stability and excellent repellency to ink ejection surface. In addition, from the comparison of Examples 5 and 6 with Examples 7 to 9, the following is clear: by containing, as the pigment dispersing agent, the compound having a polyalkylene oxide chain and/or an aliphatic hydrocarbon chain having 12 or more carbon atoms, repellency to ink ejection surface is increased further.

Example 10

Preparation of Violet Pigment Dispersion Liquid

A dispersion liquid was obtained in the same manner as Example 1, except that 9.4 parts of BYKJET-9150 was used; 66.3 parts of SR508 was used; and 22 parts of Pigment Violet 19 (violet pigment "PV19" manufactured by Clariant Corp.) was used in place of PY155. Then, to the dispersion liquid, 2.2 parts of SOLSPERSE 20000 was added and agitated, thus obtaining the violet pigment dispersion liquid of Example 10.

Example 11

Preparation of Blue Pigment Dispersion Liquid

A dispersion liquid was obtained in the same manner as Example 1, except that 6.8 parts of BYKJET-9150 was used; 79.9 parts of SR508 was used; and 12 parts of Pigment Blue 15:4 (a cyan pigment manufactured by Toyo Ink Co., Ltd.) was used in place of PY155. Then, to the dispersion liquid, 1.2 parts of SOLSPERSE 20000 was added and agitated, thus obtaining the blue pigment dispersion liquid of Example 11.

Example 12

Preparation of Black Pigment Dispersion Liquid

A dispersion liquid was obtained in the same manner as Example 1, except that 6.8 parts of BYKJET-9150 was used; 79.9 parts of SR508 was used; and 12 parts of carbon black (a black pigment manufactured by Degusa) was used in place of PY155. Then, to the dispersion liquid, 1.2 parts of SOLSPERSE 20000 was added and agitated, thus obtaining the black pigment dispersion liquid of Example 12.

Example 13

Preparation of Black Pigment Dispersion Liquid

The black pigment dispersion liquid A of Example 13 was obtained as follows. First, 5.1 parts of BYKJET-9150 was dissolved in 82.9 parts of phenoxyethyl acrylate ("SR339A" manufactured by Sartomer); 12 parts of carbon black (a black pigment manufactured by Degusa) was added thereto; and the black pigment was dispersed with a paint shaker using 1 mm-diameter zirconia beads so that the pigment particle diameter (median diameter) is 200 nm or less, thus obtaining the black pigment dispersion liquid A of Example 13.

The temporal stability evaluation (1) and the repellency evaluation were carried out in the same manner as above, on the pigment dispersion liquids of Examples 10 to 13. The results are shown in Table 3.

TABLE 3

Violet, blue and black pigment dispersion liquids

| Materials | Material name | Example 10 | Example 11 | Example 12 | Example 13 |
|---|---|---|---|---|---|
| Pigment | PV19 | 22 | | | |
| | PB15:4 | | 12 | | |
| | Carbon black | | | 12 | 12 |
| Pigment dispersing agent | BYKJET-9150 | 9.4 | 6.8 | 6.8 | 5.1 |
| Polymer | S20000 | 2.2 | 1.2 | 1.2 | |
| Compound having an ethylenically unsaturated double bond | SR339A | | | | 82.9 |
| | SR508 | 66.3 | 79.9 | 79.9 | |
| Polymerization inhibitor | TDP | 0.1 | 0.1 | 0.1 | |
| Evaluation | Initial viscosity | 130 | 30 | 19 | 21 |
| | Temporal stability (1) | 2% | −1% | 4% | 4% |
| | Temporal stability (1) evaluation | A | A | A | A |
| | Repellency | A | A | A | B |

Example 14

Preparation of Active Energy Ray-Curable Inkjet Ink Composition

The active energy ray-curable inkjet ink composition of Example 14 was obtained by mixing the yellow pigment dispersion liquid obtained in Example 3 with the following compounds having an ethylenically unsaturated double bond, photopolymerization initiators, polymerization inhibitor and silicon-based surfactant, in accordance with the composition shown in Table 4. The components shown in Table 4 are expressed in "part by mass".

Compounds having an ethylenically unsaturated double bond:
  N-vinylcaprolactam ("V-CAP" manufactured by ISP Japan)
  2-Hydroxy-3-phenoxyethyl acrylate ("M600A" manufactured by Kyoeisha Chemical Co., Ltd.)
  Bisphenol A diacrylate (Bisphenol A EO-modified (20 mol-modified) diacrylate, "A-BPE-20" manufactured by Shin-Nakamura Chemical Co., Ltd.)
  Isobornyl acrylate ("ZA-IBXA" manufactured by Kyoeisha Chemical Co., Ltd.)
  Phenoxyethyl acrylate ("SR339A" manufactured by Sartomer)
Photopolymerization initiators:
  2,4,6-Trimethylbenzoyl-diphenyl-phosphine oxide ("Lucirin TPO" manufactured by BASF)
  2-Benzyl-2-dimethylamino-1-(4-morpholinophenyl)-butanone-1 ("Irgacure 369" manufactured by BASF)
  1-Hydroxy-cyclohexyl-phenyl-ketone ("Irgacure 184" manufactured by BASF)
Polymerization inhibitor:
  Phenothiazine ("TDP" manufactured by Kawaguchi Chemical Industry Co., Ltd.)
Silicon-based surfactant:
  Tegorad 2300

Examples 15 to 26

Preparation of Active Energy Ray-Curable Inkjet Ink Compositions

The active energy ray-curable inkjet ink compositions of Examples 15 to 26 were obtained in the same manner as Example 14, in accordance with the components and compositions shown in Table 4, except that the yellow pigment dispersion liquid of Example 4 was used in place of the yellow pigment dispersion liquid of Example 3.

In Table 4, the meanings of the abbreviations of the compounds having an ethylenically unsaturated double bond and those of the polymerization inhibitors are as follows.
Laromer TBCH:
  t-Butyl cyclohexyl acrylate manufactured by BASF
FA-511AS:
  Dicyclopentenyl acrylate manufactured by Hitachi Chemical Co., Ltd.
EC-A:
  Ethyl carbitol acrylate manufactured by Kyoeisha Chemical Co., Ltd.
1,9-NDA:
  1,9-Nonanediol diacrylate manufactured by Kyoeisha Chemical Co., Ltd.
SR9003:
  Propoxylated neopentyl glycol diacrylate manufactured by Sartomer
V#335HP:
  Tetraethylene glycol diacrylate manufactured by Osaka Organic Chemical Industry Ltd.
4HBA:
  4-Hydroxybutyl acrylate manufactured by Osaka Organic Chemical Industry Ltd.
SR257:
  Stearyl acrylate manufactured by Sartomer

Comparative Example 11

Preparation of Active Energy Ray-Curable Inkjet Ink Composition

The active energy ray-curable inkjet ink composition of Comparative Example 11 was obtained in the same manner as Example 14, in accordance with the components and composition shown in Table 4, except that the yellow pigment dispersion liquid of Comparative Example 9 was used in place of the yellow pigment dispersion liquid of Example 3.

Examples 27 to 29

Preparations of Active Energy Ray-Curable Inkjet Ink Compositions

The active energy ray-curable inkjet ink compositions of Examples 27 to 29 were obtained in the same manner as Example 14, in accordance with the components and compositions shown in Table 5, except that the magenta pigment dispersion liquid of Example 8, the blue pigment dispersion liquid of Example 11, and the black pigment dispersion liquid of Example 12 were used respectively in Examples 27, 28 and 29, in place of the yellow pigment dispersion liquid of Example 3. The components shown in Table 5 are expressed in "part by mass".

Example 30

Preparation of Active Energy Ray-Curable Inkjet Ink Composition

The black pigment dispersion liquid of Example 13 was mixed with the following compounds having an ethylenically unsaturated double bond, photopolymerization initiators and silicon-based surfactant.
 Compounds having an ethylenically unsaturated double bond:
  Phenoxyethyl acrylate ("SR339A")
  t-Butylcyclohexyl acrylate ("Laromer TBCH" manufactured by BASF)
  Isobornyl acrylate ("ZA-IBXA" manufactured by Kyoeisha Chemical Co., Ltd.)
 Photopolymerization initiators:
  2,4,6-Trimethylbenzoyl-diphenyl-phosphine oxide ("Lucirin TPO" manufactured by BASF)
  2-Benzyl-2-dimethylamino-1-(4-morpholinophenyl)-butanone-1 ("Irgacure 369" manufactured by BASF)
  1-Hydroxy-cyclohexyl-phenyl-ketone ("Irgacure 184" manufactured by BASF)
 Silicon-based surfactant:
  Tegorad 2300
Next, the following polymerization inhibitors were added thereto and agitated.

Phenothiazine-type polymerization inhibitor:
 Phenothiazine ("TDP" manufactured by Seiko Chemical Co., Ltd.) 0.05 part
Nitrosamine-type polymerization inhibitor:
 N-nitroso-N-phenylhydroxylamine aluminum salt ("Q-1301" manufactured by Wako Pure Chemical Industries, Ltd.) 0.05 part
Then, the thus-obtained mixture was filtered through a membrane filter, thus obtaining the active energy ray-curable inkjet ink composition of Example 30, the composition having the composition shown in Table 5.

Example 31

Preparation of Active Energy Ray-Curable Inkjet Ink Composition

The active energy ray-curable inkjet ink composition of Example 31 was obtained in the same manner as Example 30, except that the polymerization inhibitor used in Example 31 is 0.05 part of N-nitroso-N-phenylhydroxylamine aluminum salt ("Q-1301" manufactured by Wako Pure Chemical Industries, Ltd.) only, and phenothiazine was not used.

<Temporal Stability Evaluation (2) of Inkjet Ink Compositions>

The viscosity of the active energy ray-curable inkjet ink compositions obtained in Examples 14 to 31 and Comparative Example 11, was measured with an AMVn viscometer manufactured by Anton Paar, under a temperature condition of 40° C.

Also, 40 cc of each active energy ray-curable inkjet ink composition was put in a 50 cc glass bottle and stored at 60° for 4 weeks. After the storage, the viscosity of the ink compositions was measured by the same method as above. Next, the rate of change in the viscosity of the dispersion liquids after the storage to the viscosity of the dispersion liquids before the storage, was obtained to evaluate the temporal stability of the ink compositions. The evaluation criterion is the same as the temporal stability evaluation (1) mentioned above. The evaluation results are shown in Tables 4 and 5.

TABLE 4

| | | Inkjet ink compositions | | | | | | | |
|---|---|---|---|---|---|---|---|---|---|
| Materials | Material name | Example 14 | Example 15 | Comparative Example 11 | Example 16 | Example 17 | Example18 | Example 19 | Example 20 |
| Pigment dispersion liquid used | | Example 3 | Example 4 | Comparative Example 9 | Example 4 | Example 4 | Example 4 | Example 4 | Example 4 |
| Pigment | PY155 | 3.60 | 3.60 | 3.60 | 3.60 | 3.60 | 3.60 | 3.60 | 3.60 |
| Compound having an ethylenically unsaturated double bond | V-CAP | 20.00 | 10.00 | 10.00 | 10.00 | 10.00 | 10.00 | 10.00 | 10.00 |
| | M600A | 8.00 | | | | | | | |
| | A-BPE-20 | 6.00 | | | | | | | |
| | ZA-IBXA | 23.00 | 23.00 | 23.00 | 23.00 | 23.00 | | | |
| | Laromer TBCH | | | | | | 23.00 | | |
| | SR339A | | | | | | | 23.00 | |
| | FA-511AS | | | | | | | | 23.00 |
| | EC-A | | | | | | | | |
| | DVE-3 | | | | | | | | |
| | SR508 | | 36.19 | 33.15 | 36.19 | 36.19 | 36.19 | 36.19 | 36.19 |
| | 1,9-NDA | | | | 12.00 | | 12.00 | 12.00 | 12.00 |
| | SR9003 | | 12.00 | 12.00 | | | | | |
| | V#335HP | | | | | 12.00 | | | |
| | 4HBA | | | | | | | | |
| | SR257 | | | | | | | | |
| Photopolymerization initiator | Irgaure 84 | 2.00 | 2.00 | 2.00 | 2.00 | 2.00 | 2.00 | 2.00 | 2.00 |
| | Lucinin TPO | 6.00 | 6.00 | 6.00 | 6.00 | 6.00 | 6.00 | 6.00 | 6.00 |
| | Irgaure 369 | 4.00 | 4.00 | 4.00 | 4.00 | 4.00 | 4.00 | 4.00 | 4.00 |
| Pigment dispersing agent | BYKJET-9150 | 2.60 | 2.60 | | 2.60 | 2.60 | 2.60 | 2.60 | 2.60 |
| | DISPERBYK-168 | | | 6.00 | | | | | |

TABLE 4-continued

Inkjet ink compositions

| | | | | | | | | | |
|---|---|---|---|---|---|---|---|---|---|
| Polymer | S20000 | | 0.36 | | 0.36 | 0.36 | 0.36 | 0.36 | 0.36 |
| Polymerization inhibitor | TDP | 0.05 | 0.05 | 0.05 | 0.05 | 0.05 | 0.05 | 0.05 | 0.05 |
| Silicon-based surfactant | Tegorad 2300 | 0.20 | 0.20 | 0.20 | 0.20 | 0.20 | 0.20 | 0.20 | 0.20 |
| Evaluation | Temporal stability (2) | 5% | 6% | 25% | 4% | 7% | 9% | 6% | 7% |
| | Temporal stability (2) evaluation | B | B | C | A | B | B | B | B |
| | Repellency | A | A | D | A | A | A | A | A |

| | Materials | Material Name | Example 21 | Example 22 | Example 23 | Example 24 | Example 25 | Example 26 |
|---|---|---|---|---|---|---|---|---|
| | Pigment dispersion liquid used | | Example 4 | Example 4 | Example 4 | Example 4 | Example 4 | Example 4 |
| | Pigment | PY155 | 3.60 | 3.60 | 3.60 | 3.60 | 3.60 | 3.60 |
| | Compound having an ethylenically unsaturated double bond | V-CAP | 10.00 | 10.00 | 10.00 | 10.00 | 10.00 | 10.00 |
| | | M600A | | | | | | |
| | | A-BPE-20 | | | | | | |
| | | ZA-IBXA | 13.00 | | | | | |
| | | Laromer TBCH | 10.00 | | | | | |
| | | SR339A | | | | | | |
| | | FA-511AS | | | | | | |
| | | EC-A | | 18.00 | 18.00 | 10.00 | 10.00 | |
| | | DVE-3 | | | | | | 10.00 |
| | | SR508 | 36.19 | 36.19 | 36.19 | 36.19 | 36.19 | 36.19 |
| | | 1,9-NDA | 12.00 | 12.00 | 12.00 | | 13.00 | 13.00 |
| | | SR9003 | | | | 13.00 | | |
| | | V#335HP | | | | 12.00 | 12.00 | 12.00 |
| | | 4HBA | | 5.00 | | | | |
| | | SR257 | | | 5.00 | | | |
| | Photopolymerization initiator | Irgacure 84 | 2.00 | 2.00 | 2.00 | 2.00 | 2.00 | 2.00 |
| | | Lucirin TPO | 6.00 | 6.00 | 6.00 | 6.00 | 6.00 | 6.00 |
| | | Irgacure 369 | 4.00 | 4.00 | 4.00 | 4.00 | 4.00 | 4.00 |
| | Pigment dispersing agent | BYKJET-9150 DISPERBYK-168 | 2.60 | 2.60 | 2.60 | 2.60 | 2.60 | 2.60 |
| | Polymer | S20000 | 0.36 | 0.36 | 0.36 | 0.36 | 0.36 | 0.36 |
| | Polymerization inhibitor | TDP | 0.05 | 0.05 | 0.05 | 0.05 | 0.05 | 0.05 |
| | Silicon-based surfactant | Tegorad 2300 | 0.20 | 0.20 | 0.20 | 0.20 | 0.20 | 0.20 |
| | Evaluation | Temporal stability (2) | 4% | 8% | 7% | 8% | 8% | 6% |
| | | Temporal stability (2) evaluation | A | B | B | B | B | B |
| | | Repellency | A | A | A | A | A | A |

TABLE 5

Inkjet ink compositions

| Materials | Material name | Example 27 | Example 28 | Example 29 | Example 30 | Example 31 |
|---|---|---|---|---|---|---|
| Pigment dispersion liquid used | | Example 8 | Example 11 | Example 12 | Example 13 | Example 13 |
| Pigment | PR122 | 4.00 | | | | |
| | PB15:4 | | 2.40 | | | |
| | Carbon black | | | 2.10 | 2.00 | 2.00 |
| Compound having an ethylenically unsaturated double bond | SR508 | 19.05 | 21.71 | 22.24 | | |
| | V-CAP | 20.00 | 20.00 | 20.00 | 20.00 | 20.00 |
| | ZA-IBXA | 28.00 | 28.00 | 28.00 | 40.00 | 40.00 |
| | M600A | 10.00 | 10.00 | 10.00 | | |
| | A-BPE-20 | 4.00 | 4.00 | 4.00 | | |
| | SR339A | | | | 16.90 | 16.90 |
| | Laromer TBCH | | | | 8.00 | 8.00 |
| Photopolymerization initiator | Irgacure 184 | 2.00 | 2.00 | 2.00 | 4.00 | 4.00 |
| | Lucirin TPO | 6.00 | 6.00 | 6.00 | 4.00 | 4.00 |
| | Irgacure 369 | 4.00 | 4.00 | 4.00 | 4.00 | 4.00 |

TABLE 5-continued

| | | Inkjet ink compositions | | | | |
|---|---|---|---|---|---|---|
| Materials | Material name | Example 27 | Example 28 | Example 29 | Example 30 | Example 31 |
| Pigment dispersing agent | BYKJET-9150 | 2.30 | 1.40 | 1.20 | 0.90 | 0.90 |
| Polymer | S20000 | 0.40 | 0.24 | 0.21 | | |
| Polymerization inhibitor | TDP | 0.05 | 0.05 | 0.05 | 0.05 | |
| | Q-1301 | | | | 0.05 | 0.05 |
| Silicon-based surfactant | Tegorad 2300 | 0.20 | 0.20 | 0.20 | 0.20 | 0.20 |
| Evaluation | Temporal stability (2) | 0% | 4% | 4% | 1% | 9% |
| | Temporal stability (2) evaluation | A | A | A | A | B |
| | Repellency | A | A | A | A | A |

From the results shown in Tables 4 and 5, it is clear that the active energy ray-curable inkjet ink composition obtained by using the pigment dispersion liquid for inkjet ink according to the present invention, is excellent in repellency to ink ejection surface, shows almost no viscosity change even after a long period of storage and is excellent in temporal stability.

Reference Production Example 1

Preparation of Black Pigment Dispersion Liquid A

First, 12 parts of a polymer dispersant ("DISPERBYK-168" manufactured by BYK Japan KK, amine value 11 mgKOH/g, solid content about 30% by mass) was dissolved in 76 parts of phenoxyethyl acrylate ("SR339A" manufactured by Sartomer). Then, 12 parts of carbon black (a black pigment manufactured by Degusa) was added thereto and dispersed with a paint shaker using 1 mm-diameter zirconia beads so that the pigment particle diameter (median diameter) is 200 nm or less, thus obtaining the black pigment dispersion liquid A. The particle diameter was measured by "FPAR-1000" manufactured by Otsuka Electronics Co., Ltd.

Reference Example 1

Preparation of Active Energy Ray-Curable Inkjet Ink Composition (1)

The black pigment dispersion liquid A obtained in Reference Production Example 1, was mixed with the following compounds having an ethylenically unsaturated double bond, photopolymerization initiators and silicon-based surfactant, in accordance with the composition of a black ink A shown in Table 6, thus preparing the black ink A.
  Compounds having an ethylenically unsaturated double bond:
    Phenoxyethyl acrylate ("SR339A")
    t-Butylcyclohexyl acrylate ("Laromer TBCH" manufactured by BASF)
    Isobornyl acrylate ("ZA-IBXA" manufactured by Kyoeisha Chemical Co., Ltd.)
  Photopolymerization initiators:
    2,4,6-Trimethylbenzoyl-diphenyl-phosphine oxide ("Lucirin TPO" manufactured by BASF)
    2-Benzyl-2-dimethylamino-1-(4-morpholinophenyl)-butanone-1 ("Irgacure 369" manufactured by BASF)
    1-Hydroxy-cyclohexyl-phenyl-ketone ("Irgacure 184" manufactured by BASF)
  Silicon-based surfactant:
    Tegorad 2300
  Next, the following polymerization inhibitors were added thereto and agitated.
    Phenothiazine-type polymerization inhibitor:
      Phenothiazine ("TDP" manufactured by Seiko Chemical Co., Ltd.) 0.02 part
    Nitrosamine-type polymerization inhibitor:
      N-nitroso-N-phenylhydroxylamine aluminum salt ("Q-1301" manufactured by Wako Pure Chemical Industries, Ltd.) 0.01 part
Then, the thus-obtained mixture was filtered through a membrane filter, thus obtaining the active energy ray-curable inkjet ink composition (1) of Reference Example 1.

TABLE 6

| Composition of black ink (part by mass) | | |
|---|---|---|
| Materials | Material name | Black ink A |
| Pigment | Carbon black | 2 |
| Polymer dispersant | DISPERBYK-168 | 2 |
| Compound having an ethylenically unsaturated double bond | SR339A | 15.8 |
| | Laromer TBCH | 8 |
| | ZA-IBXA | 60 |
| Photopolymerization initiator | Lucirin TPO | 4 |
| | Irgacure 369 | 4 |
| | Irgacure 184 | 4 |
| Silicon-based surfactant | Tegorad 2300 | 0.2 |

Reference Example 2

Preparation of Active Energy Ray-Curable Inkjet Ink Composition (2)

The active energy ray-curable inkjet ink composition (2) of Reference Example 2 was obtained in the same manner as Reference Example 1, except that 0.05 part of TDP was used.

Reference Example 3

Preparation of Active Energy Ray-Curable Inkjet Ink Composition (3)

The active energy ray-curable inkjet ink composition (3) of Reference Example 3 was obtained in the same manner as Reference Example 1, except that 0.1 part of TDP was used.

Reference Example 4

Preparation of Active Energy Ray-Curable Inkjet Ink Composition (4)

The active energy ray-curable inkjet ink composition (4) of Reference Example 4 was obtained in the same manner as Reference Example 1, except that 0.05 part of TDP and 0.05 part of Q-1301 were used.

Reference Example 5

Preparation of Active Energy Ray-Curable Inkjet Ink Composition (5)

The active energy ray-curable inkjet ink composition (5) of Reference Example 5 was obtained in the same manner as Reference Example 1, except that 0.05 part of TDP and 0.1 part of Q-1301 were used.

Comparative Reference Example 1

Preparation of Comparative Active Energy Ray-Curable Inkjet Ink Composition (1)

The comparative active energy ray-curable inkjet ink composition (1) of Comparative Reference Example 1 was obtained in the same manner as Reference Example 1, except that 0.1 part of TDP was used and Q-1301 was not used.

Comparative Reference Example 2

Preparation of Comparative Active Energy Ray-Curable Inkjet Ink Composition (2)

The comparative active energy ray-curable inkjet ink composition (2) of Comparative Reference Example 2 was obtained in the same manner as Reference Example 1, except that Q-1301 was not used.

Comparative Reference Example 3

Preparation of Comparative Active Energy Ray-Curable Inkjet Ink Composition (3)

The comparative active energy ray-curable inkjet ink composition (3) of Comparative Reference Example 3 was obtained in the same manner as Reference Example 1, except that 0.2 part of Q-1301 was used and TDP was not used.

Comparative Reference Example 4

Preparation of Comparative Active Energy Ray-Curable Inkjet Ink Composition (4)

The comparative active energy ray-curable inkjet ink composition (4) of Comparative Reference Example 4 was obtained in the same manner as Reference Example 1, except that 0.02 part of Q-1301 was used and TDP was not used.

Comparative Reference Example 5

Preparation of Comparative Active Energy Ray-Curable Inkjet Ink Composition (5)

The comparative active energy ray-curable inkjet ink composition (5) of Comparative Reference Example 5 was obtained in the same manner as Reference Example 1, except that 0.05 part of TDP was used and 0.05 part of IRGANOX 1010, which is a hindered phenol-type polymerization inhibitor manufactured by BASF, was used in place of Q-1301.

Comparative Reference Example 6

Preparation of Comparative Active Energy Ray-Curable Inkjet Ink Composition (6)

The comparative active energy ray-curable inkjet ink composition (6) of Comparative Reference Example 6 was obtained in the same manner as Reference Example 1, except that 0.05 part of TDP was used and 0.5 part of IRGANOX 1010, which is a hindered phenol-type polymerization inhibitor manufactured by BASF, was used in place of Q-1301.

Comparative Reference Example 7

Preparation of Comparative Active Energy Ray-Curable Inkjet Ink Composition (7)

The comparative active energy ray-curable inkjet ink composition (7) of Comparative Reference Example 7 was obtained in the same manner as Reference Example 1, except that 0.05 part of TDP was used and 0.5 part of TINUVIN 292, which is a hindered amine-type polymerization inhibitor manufactured by BASF, was used in place of Q-1301.

Comparative Reference Example 8

Preparation of Comparative Active Energy Ray-Curable Inkjet Ink Composition (8)

The comparative active energy ray-curable inkjet ink composition (8) of Comparative Reference Example 8 was obtained in the same manner as Reference Example 1, except that 0.05 part of TDP was used and 0.5 part of MEHQ, which is a quinone-type polymerization inhibitor manufactured by Seiko Chemical Co., Ltd., was used in place of Q-1301.

Comparative Reference Example 9

Preparation of Comparative Active Energy Ray-Curable Inkjet Ink Composition (9)

The comparative active energy ray-curable inkjet ink composition (9) of Comparative Reference Example 9 was obtained in the same manner as Reference Example 1, except that 0.05 part of TDP was used and 0.5 part of IRGASTAB UV22, which is a quinone-type polymerization inhibitor manufactured by BASF, was used in place of Q-1301.

Comparative Reference Example 10

Preparation of Comparative Active Energy Ray-Curable Inkjet Ink Composition (10)

The comparative active energy ray-curable inkjet ink composition (10) of Comparative Reference Example 10 was obtained in the same manner as Reference Example 1, except that 0.05 part of Q-1301 was used and 0.05 part of TINUVIN 292, which is a hindered amine-type polymerization inhibitor manufactured by BASF, was used in place of TDP.

Comparative Reference Example 11

Preparation of Comparative Active Energy Ray-Curable Inkjet Ink Composition (11)

The comparative active energy ray-curable inkjet ink composition (11) of Comparative Reference Example 11 was obtained in the same manner as Reference Example 1, except that 0.05 part of Q-1301 was used and 0.5 part of TINUVIN 292, which is a hindered amine-type polymerization inhibitor manufactured by BASF, was used in place of TDP.

Comparative Reference Example 12

Preparation of Comparative Active Energy Ray-Curable Inkjet Ink Composition (12)

The comparative active energy ray-curable inkjet ink composition (12) of Comparative Reference Example 12 was obtained in the same manner as Reference Example 1, except that 0.05 part of Q-1301 was used and 0.05 part of IRGANOX 1010, which is a hindered phenol-type polymerization inhibitor manufactured by BASF, was used in place of TDP.

<Stability Evaluation>

The viscosity of the active energy ray-curable inkjet ink compositions obtained in Reference Examples 1 to 5, Comparative Reference Examples 1 to 12 and Examples 30 and 31, was measured with an AMVn viscometer manufactured by Anton Paar, under a temperature condition of 40° C.

Also, each of the active energy ray-curable inkjet ink compositions was stored under the following two conditions. After the storage, the viscosity of the ink compositions was measured by the same method as above. Next, the rate of change in the viscosity of the dispersion liquids after the storage to the viscosity of the dispersion liquids before the storage, was obtained to evaluate the temporal stability of the ink compositions. The evaluation results are shown in Table 7. The below-mentioned storage condition 1 is the same condition as the above-mentioned temporal stability evaluation (2).

[Storage Condition]

Storage condition 1 (in the presence of oxygen): First, 40 cc of each ink composition was put in a 50 cc glass bottle and then stored at 60° C. for 4 weeks.

Storage condition 2 (under an oxygen-free atmosphere): First, 40 cc of each ink composition was put in an aluminum bag. After expelling any remaining air from the bag, the bag was hermetically sealed and stored at 60° C. for 4 weeks.

[Stability Evaluation Criterion]

A: Change rate is less than 5%.
B: Change rate is 5% or more and less than 10%.
C: Change rate is 10% or more and less than 50%.
D: Change rate is 50% or more.

When the stability evaluation result is "A", the inkjet ink composition is particularly excellent in stability. When the stability evaluation result is "B", the inkjet ink composition is usable with no problem in practical use.

<Curability Evaluation>

Each of the active energy ray-curable inkjet ink compositions of Reference Examples 1 to 5, Comparative Reference Examples 1 to 12 and Example 30 was printed on a PET film ("A4300" manufactured by Toyobo Co., Ltd.) at 360 dpi, using an inkjet head ("KM512MH" manufactured by KONICA MINOLTA). Then, by using a UV lamp ("Light Hammer 6" manufactured by Fusion UV Systems Japan KK.), the printed sheet was treated with ultraviolet irradiation so as to reach an accumulated light amount of 30 $mJ/cm^2$ and a peak irradiance of 90 $mW/cm^2$, thus obtaining a coating film. The thus-obtained coating films were evaluated in accordance with the following evaluation criteria. The evaluation results are shown in Table 7.

[Curability Evaluation Criterion]

○: No tackiness was ascertained by applying finger pressure.
x: Tackiness was ascertained by applying finger pressure.

TABLE 7

| | | Amount of polymerization inhibitor (part by mass) | | | | | | | | |
|---|---|---|---|---|---|---|---|---|---|---|
| | Ink type | Phenothiazine-type polymerization inhibitor | | Nitrosamine-type polymerization inhibitor | | Other polymerization inhibitor | | Storage condition | Rate of change | Stability | Curability | Evaluation |
| Reference Example 1 | Black ink A | TDP | 0.02 | Q-1301 | 0.01 | — | — | 1 | 3% | A | ○ | ○ |
| | | | | | | | | 2 | 3% | A | | |
| Reference Example 2 | Black ink A | TDP | 0.05 | Q-1301 | 0.01 | — | — | 1 | 4% | A | ○ | ○ |
| | | | | | | | | 2 | 3% | A | | |
| Reference Example 3 | Black ink A | TDP | 0.1 | Q-1301 | 0.01 | — | — | 1 | 3% | A | ○ | ○ |
| | | | | | | | | 2 | 2% | A | | |
| Reference Example 4 | Black ink A | TDP | 0.05 | Q-1301 | 0.05 | — | — | 1 | 3% | A | ○ | ○ |
| | | | | | | | | 2 | 4% | A | | |
| Reference Example 5 | Black ink A | TDP | 0.05 | Q-1301 | 0.1 | — | — | 1 | 2% | A | ○ | ○ |
| | | | | | | | | 2 | 3% | A | | |
| Comparative Reference Example 1 | Black ink A | TDP | 0.1 | — | — | — | — | 1 | 5% | B | ○ | x |
| | | | | | | | | 2 | >100% | D | | |
| Comparative Reference Example 2 | Black ink A | TDP | 0.02 | — | — | — | — | 1 | 7% | B | ○ | x |
| | | | | | | | | 2 | >100% | D | | |
| Comparative Reference Example 3 | Black ink A | — | — | Q-1301 | 0.2 | — | — | 1 | 12% | C | x | x |
| | | | | | | | | 2 | 7% | B | | |

TABLE 7-continued

| | | Amount of polymerization inhibitor (part by mass) | | | | | | | | | |
|---|---|---|---|---|---|---|---|---|---|---|---|
| | Ink type | Phenothiazine-type polymerization inhibitor | | Nitrosamine-type polymerization inhibitor | | Other polymerization inhibitor | | Storage condition | Rate of change | Stability | Curability | Evaluation |
| Comparative Reference Example 4 | Black ink A | — | — | Q-1301 | 0.02 | — | — | 1<br>2 | 11%<br>5% | C<br>B | ○ | x |
| Comparative Reference Example 5 | Black ink A | TDP | 0.05 | — | — | IRGANOX 1010 | 0.05 | 2 | >100% | D | ○ | x |
| Comparative Reference Example 6 | Black ink A | TDP | 0.05 | — | — | IRGANOX 1010 | 0.5 | 2 | >100% | D | x | x |
| Comparative Reference Example 7 | Black ink A | TDP | 0.05 | — | — | TINUVIN 292 | 0.5 | 2 | >100% | D | x | x |
| Comparative Reference Example 8 | Black ink A | TDP | 0.05 | — | — | MEHQ | 0.5 | 2 | >100% | D | x | x |
| Comparative Reference Example 9 | Black ink A | TDP | 0.05 | — | — | IRGASTAB UV22 | 0.5 | 2 | 10% | C | x | x |
| Comparative Reference Example 10 | Black ink A | — | — | Q-1301 | 0.05 | TINUVIN 292 | 0.05 | 1 | 12% | C | ○ | x |
| Comparative Reference Example 11 | Black ink A | — | — | Q-1301 | 0.05 | TINUVIN 292 | 0.5 | 1 | 11% | C | x | x |
| Comparative Reference Example 12 | Black ink A | — | — | Q-1301 | 0.05 | IRGANOX 1010 | 0.05 | 1 | 12% | C | ○ | x |
| Example 30 | — | TDP | 0.05 | Q-1301 | 0.05 | — | — | 1<br>2 | 1%<br>2% | A<br>A | ○ | ○ |
| Example 31 | — | — | — | Q-1301 | 0.05 | — | — | 1<br>2 | 9%<br>4% | B<br>A | ○ | ○ |

From the results shown in Table 7, it is clear that the inkjet ink compositions of Reference Examples 1 to 5 and Example 30, in each of which a combination of the phenothiazine-type polymerization inhibitor and the nitrosamine-type polymerization inhibitor is used, are excellent in storage stability even in the presence of oxygen and even under the oxygen-free atmosphere, and are excellent in curability.

Compared to the inkjet ink compositions of Comparative Reference Examples 1 and 2 in which no nitrosamine-type polymerization inhibitor is used, the inkjet ink compositions of Reference Examples 1 to 5 and Example 30 are higher in storage stability in the presence of oxygen and are significantly higher in storage stability under the oxygen-free atmosphere. Compared to the inkjet ink compositions of Comparative Reference Examples 3 and 4 in which no phenothiazine-type polymerization inhibitor is used, the inkjet ink compositions of Reference Examples 1 to 5 and Example 30 are higher in storage stability even in the presence of oxygen and even under the oxygen-free atmosphere. It is clear that especially the inkjet ink composition of Example 30 using the pigment dispersing agent which contains one or more components selected from the group consisting of: the copolymer having the styrene-derived repeating unit, the repeating unit derived from the unsaturated fatty acid having 16 carbon atoms and the unsaturated fatty acid having 18 carbon atoms, and the repeating unit derived from the polyalkylene oxide having an ethylenically unsaturated double bond and being 10 to 60 mol relative to 1 mol of the repeating unit derived from the unsaturated fatty acids; an alkali metal salt of the copolymer; an alkaline-earth metal salt of the copolymer; an ammonium salt of the copolymer; and an amine derivative of the copolymer, is particularly excellent in storage stability. From a comparison between the inkjet ink compositions of Example 31, Comparative Reference Example 3 and Comparative Reference Example 4, in which the same polymerization inhibitor is used, it is clear that the inkjet ink composition in which the pigment dispersing agent is used, is excellent in storage stability.

In Comparative Reference Example 5, the hindered phenol-type polymerization inhibitor was used in the same amount as Examples 14 to 30, in place of the nitrosamine-type polymerization inhibitor. Therefore, no improvement is shown in long-term storage stability under the oxygen-free atmosphere. In Comparative Reference Example 6, the hindered phenol-type polymerization inhibitor was used in the same amount as Patent Literature 3. Nevertheless, no improvement is shown in long-term storage stability under the oxygen-free atmosphere, and a deterioration in curability is observed. In Comparative Reference Examples 7 to 9, in place of the nitrosamine-type polymerization inhibitor, the hindered amine-type polymerization inhibitor or quinone-type polymerization inhibitor was used in the same amount as Patent Literature 4. However, no improvement is shown in long-term storage stability under the oxygen-free atmosphere, and a deterioration in curability is observed. From the results of Comparative Reference Examples 5 to 9, it is clear that the long-term storage stability under the oxygen-free atmosphere is not improved even through the phenothiazine-type polymerization inhibitor is used in combination with a different polymerization inhibitor other than the nitrosamine-type polymerization inhibitor.

From the results of Comparative Reference Examples 10 to 12, it is also clear that the long-term storage stability in the presence of oxygen is not improved even through the nitrosamine-type polymerization inhibitor is used in combination with a different polymerization inhibitor other than the phenothiazine-type polymerization inhibitor.

When the phenothiazine-type polymerization inhibitor is used in combination with the nitrosamine-type polymerization inhibitor, the viscosity change is less than 5%, both in the presence of oxygen and under the oxygen-free atmosphere. Therefore, it is clear that the storage stability is improved much higher than the case of using only one of the phenothiazine-type polymerization inhibitor and the nitrosamine-type polymerization inhibitor or than the case of using one of the phenothiazine-type polymerization inhibitor and the nitrosamine-type polymerization inhibitor in combination with a different polymerization inhibitor.

From the comparison between Example 30 and Example 31, it is clear that the storage stability is further improved by using the phenothiazine-type polymerization inhibitor in combination with the nitrosamine-type polymerization inhibitor, even in the inkjet ink using the pigment dispersing agent which contains one or more components selected from the group consisting of: the copolymer having the styrene-derived repeating unit, the repeating unit derived from the unsaturated fatty acid having 16 carbon atoms and the unsaturated fatty acid having 18 carbon atoms, and the repeating unit derived from the polyalkylene oxide having an ethylenically unsaturated double bond and being 10 to 60 mol relative to 1 mol of the repeating units derived from the unsaturated fatty acids; an alkali metal salt of the copolymer; an alkaline-earth metal salt of the copolymer; an ammonium salt of the copolymer; and an amine derivative of the copolymer.

In Table 7, the inkjet ink composition with an "A" or "B" in terms of stability and a "○" in terms of curability, is evaluated as "○". One with a "C" or "D" in terms of stability or a "x" in terms of curability, is evaluated as "x".

The invention claimed is:

1. A pigment dispersion liquid for inkjet ink, comprising:
   a pigment;
   a pigment dispersing agent;
   a compound having an ethylenically unsaturated double bond;
   a polymerization inhibitor; and
   a compound having a polyalkylene oxide chain and/or an aliphatic hydrocarbon chain having 12 or more carbon atoms, wherein the compound can contain an amide group or can have an amino group at a terminal thereof, and the amino group can be a salt-forming amino group,
   wherein a molecular weight of the compound having an ethylenically unsaturated double bond is 150 to 400;
   wherein the compound having an ethylenically unsaturated double bond is liquid at 25° C. and is used as a dispersion medium, and
   wherein the pigment dispersing agent has an amine value of 20 mg KOH/g or less and an acid value of 10 mg KOH/g or less, and the pigment dispersing agent contains one or more components selected from the group consisting of: a copolymer having a styrene-derived repeating unit, a repeating unit derived from an unsaturated fatty acid having 12 or more carbon atoms, and a repeating unit derived from a polyalkylene oxide having an ethylenically unsaturated double bond; an alkali metal salt of the copolymer; an alkaline-earth metal salt of the copolymer; an ammonium salt of the copolymer; and an amine derivative of the copolymer.

2. The pigment dispersion liquid for inkjet ink according to claim 1, wherein an unsaturated double bond equivalent per gram of the compound having an ethylenically unsaturated double bond, is 100 to 300 g/eq, and an acid value of the compound having an ethylenically unsaturated double bond, is 0.1% by mass or less in terms of acrylic acid.

3. An active energy ray-curable inkjet ink composition comprising the pigment dispersion liquid for inkjet ink defined by claim 1 and a photopolymerization initiator.

4. The active energy ray-curable inkjet ink composition according to claim 1, wherein the polymerization inhibitor contains a phenothiazine-type polymerization inhibitor and a nitrosamine-type polymerization inhibitor.

5. The active energy ray-curable inkjet ink composition according to claim 4, wherein a content of the phenothiazine-type polymerization inhibitor in the inkjet ink composition is 0.001 to 0.2% by mass, and a content of the nitrosamine-type polymerization inhibitor in the inkjet ink composition is 0.001 to 0.2% by mass.

6. A printed product comprising a layer formed by curing the active energy ray-curable inkjet ink composition defined by claim 3 on a recording medium.

* * * * *